(12) United States Patent
Hodgson et al.

(10) Patent No.: US 7,773,300 B2
(45) Date of Patent: Aug. 10, 2010

(54) MULTIPHOTON FLUORESCENCE FILTERS

(75) Inventors: Craig Hodgson, Fairport, NY (US);
Turan Erdogan, Spencerport, NY (US);
Ligang Wang, Rochester, NY (US)

(73) Assignee: Semrock, Inc., Rochester, NY (US)

( * ) Notice: Subject to any disclaimer, the term of this patent is extended or adjusted under 35 U.S.C. 154(b) by 0 days.

(21) Appl. No.: 11/650,441

(22) Filed: Jan. 8, 2007

(65) Prior Publication Data
US 2008/0037129 A1 Feb. 14, 2008

Related U.S. Application Data

(60) Provisional application No. 60/799,647, filed on May 12, 2006.

(51) Int. Cl.
*G02B 1/10* (2006.01)
(52) U.S. Cl. ........................... 359/588; 359/586
(58) Field of Classification Search .............. 359/586, 359/588
See application file for complete search history.

(56) References Cited

U.S. PATENT DOCUMENTS

| | | | |
|---|---|---|---|
| 4,009,453 A * | 2/1977 | Mahlein | 372/99 |
| 4,733,926 A * | 3/1988 | Title | 359/352 |
| 5,034,613 A | 7/1991 | Denk et al. | |
| 6,110,337 A | 8/2000 | Sullivan et al. | |
| 6,166,385 A | 12/2000 | Webb et al. | |
| 6,217,720 B1 | 4/2001 | Sullivan et al. | |
| 6,344,653 B1 | 2/2002 | Webb et al. | |
| 6,611,378 B1 | 8/2003 | Wang et al. | |
| 6,809,859 B2 | 10/2004 | Erdogan et al. | |
| 6,894,838 B2 | 5/2005 | Mizrahi et al. | |
| 7,068,430 B1 | 6/2006 | Clarke et al. | |
| 7,119,960 B1 | 10/2006 | Erdogan et al. | |
| 7,123,416 B1 | 10/2006 | Erdogan et al. | |
| 2004/0027652 A1 | 2/2004 | Erdogan et al. | |
| 2005/0110999 A1 | 5/2005 | Erdogan et al. | |

* cited by examiner

*Primary Examiner*—Joshua L Pritchett
(74) *Attorney, Agent, or Firm*—Finnegan, Henderson, Farabow, Garrett & Dunner LLP

(57) ABSTRACT

An optical filter is provided which includes a plurality of hard coating layers of alternating high and low refractive index provided on a substrate and has an associated first transmission band. The filter also includes at least one additional plurality of hard coating layers including high and low refractive index layers and Herpin equivalent layers sandwiched therebetween. The additional plurality of layers has an associated second transmission band that substantially coincides with the first transmission band, but provides additional blocking at wavelengths outside the first transmission band. Relatively wide transmission bands and high blocking over an extended range of wavelengths can be achieved such that the filter is suitable for use in multiphoton fluorescence systems.

23 Claims, 16 Drawing Sheets

MULTIPHOTON FLUORESCENCE FILTERS

The present application claims the benefit of provisional Application No. 60/799,647 filed on May 12, 2006, the contents of which are incorporated herein by reference.

The present disclosure is related to optical filters. In particular, the present disclosure is directed toward optical filters suitable for use in multiphoton fluorescence systems.

BACKGROUND OF THE DISCLOSURE

Fluorescence systems are often employed to analyze or image biological samples. In such systems, the sample is typically exposed to laser light at a wavelength at which a material of interest in the sample, such as a fluorophore or a naturally occurring substance in the material, absorbs light causing it to fluoresce or emit light at a different (typically longer) wavelength. Light emitted from the sample is then detected so that the location, amount, and other properties associated with the material of interest, as well the sample, can be determined. In addition, an image of the sample can be constructed based on the detected fluorophore, for example.

In many fluorescence systems, a single photon of laser light excites an atom in the material of interest. The atom then relaxes to a lower energy state, and, in doing so, a single photon is emitted. In so-called "multiphoton" fluorescence systems, however, multiple laser light photons simultaneously excite the atom of the material of interest into a higher energy state. When the atom relaxes, it emits a photon typically having more energy (shorter wavelength) than the energy associated with the laser photons having longer wavelengths. For example, fluorescein, a known fluorophore, strongly absorbs light at 500 nm, but can also be excited via a two-photon process at about 1000 nm. Similarly, certain naturally occurring fluorescent molecules strongly absorb light at about 350 nm, and can be excited via a three-photon process at about 1050 nm. U.S. Pat. Nos. 5,034,613, 6,166,385, and 6,344,653 describe microscope systems for measuring multiphoton fluorescence, and are incorporated herein as references.

Typically, the laser light in a multiphoton fluorescence system is applied at relatively high intensity to a localized region or focused spot in the sample. The three-dimensional focal spot of the laser light can penetrate deep into the sample, especially if longer wavelengths in the infrared are employed. Accordingly, by changing the depth of penetration and detecting a two dimensional section of the sample at each depth, a three dimensional composite image of the sample can be obtained by stacking the two dimensional sections with known imaging software. Moreover, since only the localized region emits light, only that region is imaged.

Multiphoton fluorescence occurs with a reasonably high probability when two or more laser light photons are absorbed simultaneously (thus supplying the same energy as a single photon at the main absorption wavelength). Accordingly, multiphoton fluorescence often requires high laser light intensities, or a large density of photons in a relatively short period of time. Therefore, conventional high-power pulsed lasers are often used, such as tunable Ti:Sapphire lasers, which can output light at wavelengths as short as about 680 nm and as long as about 1100 nm. With higher laser light intensities, each two dimensional section can be finely resolved and the resulting three dimensional image can be made sharper.

Relative to alternative fluorescence imaging techniques, multiphoton imaging advantageously makes it possible to: study dynamic processes in thick living cells; eliminate undesirable noise fluorescence above and below each two dimensional section; reduce undesirable photobleaching of the sample outside each two dimensional section, thereby preventing overexposure of the sample; eliminate the optical loss associated with a detector pinhole as required in other three-dimensional fluorescent imaging systems, such as confocal microscopy systems.

In addition to the lasers described above, multiphoton fluorescence systems typically include a photodetector in order to sense the emitted light. In order to reduce the amount of other light reaching detector, such as light from the laser, filters must be employed which are transmissive at wavelengths of light emitted by the sample, but reflective and/or absorbing at other wavelengths. If light at such other wavelengths is adequately suppressed, a so called "spectral darkfield" can be achieved in which an image is black or dark when no features of interest are present. Image quality can thus be improved. Without this spectral darkfield property, in most samples no fluorescence could be observed.

Optical filters are also used to direct the laser light to the sample, and if highly reflective or transmissive at wavelengths associated with the emitted light, can efficiently direct the emitted light toward the photodetector.

With improved optical filters, more photons of emitted light and fewer photons of undesired light (e.g., the laser light) are fed to the photodetector. Thus, weaker signals can be detected, or less laser light is required to generate a given emitted optical signal, thereby minimizing damage to the sample by intense laser light. Or, an image can be detected in less time leading to higher speed measurements. A higher signal-to-noise ratio (and therefore better resolution) can be achieved in the image, since, for example, the filter can block more laser light from reaching the photodetector, while transmitting a given intensity of emitted light. Also, systems having additional functionality, such as a systems that can accurately sense light over a broader range of emission wavelengths, can be achieved. Such systems can include filters having relatively wide transmission wavelength bands, as well as wide blocking wavelength bands. As a result, new fluorophores or fluorescent biological substances can be excited efficiently, thereby improving image quality and increasing the number of different types of samples that can be imaged.

Different fluorophores emit light at different wavelengths. In addition, the laser in a multiphoton fluorescence system should output light over a broad range of wavelengths in order to excite a wide range of fluorophores. Thus, in order to be used in connection with most known fluorophores, a filter in a multiphoton fluorescence system typically should have high transmission over a wide range of wavelengths. In addition, the filter should have high blocking over the entire range of laser wavelengths, e.g., those wavelengths associated with a Ti:Sapphire laser. Typically, however, it is difficult to achieve both high blocking and high transmission over such wide wavelength ranges. Conventional filters, therefore, either have narrower blocking or transmission bands, or the level of transmission and/or blocking is less than optimum. For example, known filters provide transmission in excess of 50% only in a range of about 410 nm to 680 nm, and reach 90% in a narrow range within this band. In addition, such filters may have an optical density ("OD" where OD=$-\log_{10}(T)$, T being transmission of the filter at a particular wavelength) less than 6 at least at certain Ti:Sapphire wavelengths, which may be inadequate when such wavelengths are required. Higher OD values can be achieved, but at the expense of creating second- and third-order stop bands of reduced transmission at selected emission wavelengths.

These higher-order "stop bands" are one reason why it is difficult to achieve high transmission at wavelengths shorter than those over which high blocking occurs. A stop band is a range of wavelengths over which transmitted light is strongly attenuated due to constructive interference of the many partial waves of light reflected off of a structure with a periodic or nearly periodic variation of the index of refraction, as found in a thin-film interference filter. For a "quarter wavelength stack" structure comprised of alternating layers of high- and low-index materials, each of which is approximately one quarter of a particular wavelength $\lambda_0$ thick (in the material), the "fundamental" stop band is roughly centered on $\lambda_0$ and ranges from approximately $\lambda_0/(1+x)$ to $\lambda_0/(1-x)$, where x is related to the high and low index of refraction values, $n_H$ and $n_L$, respectively, according to $$x = \frac{2}{\pi} \arcsin\left(\frac{n_H - n_L}{n_H + n_L}\right).$$

If the layer-to-layer index of refraction variation is not a purely sinusoidal variation, but rather changes abruptly, as is typically the case in a multi-layer thin-film interference filter, higher-order stop bands exist at shorter wavelengths. For example, a quarter-wave stack having such abrupt refractive index changes exhibits "odd-harmonic" stop bands that occur approximately at the wavelengths $\lambda_0/3$, $\lambda_0/5$, etc., and where these stop bands range from approximately $\lambda_0/(3+x)$ to $\lambda_0/(3-x)$, for the third-order stop band, $\lambda_0/(5+x)$ to $\lambda_0/(5-x)$, for the fifth-order stop band, and so on. If the layers are not exactly a quarter-wave thick, then there may also be "even-harmonic" stop bands that occur approximately at the wavelengths $\lambda_0/2$, $\lambda_0/4$, etc. In general, high blocking over a wide range is achieved by utilizing a fundamental stop band, by combining multiple fundamental stop bands, or by "chirping" (gradually varying) the layers associated with one or more fundamental stop bands. Regardless of the approach, the higher-order harmonic stop bands associated with these blocking layers inhibit transmission at wavelengths shorter than the fundamental stop band or stop bands.

Other filters are known which have a relatively wide transmission band, but the transmission within the band is reduced. Still other filters can achieve moderately high transmission within a range of about 430 nm to 710 nm and moderately high reflection or blocking from about 780 nm to 1100 nm. The transmission characteristic of these filters, however, has a relatively shallow slope for wavelengths between the transmission and the blocking bands. As a result, light at such wavelengths may be detected by the photodetector, thereby reducing image quality.

SUMMARY OF THE DISCLOSURE

Additional objects and advantages will be set forth in part in the description which follows, and in part will be obvious from the description, or may be learned by practice of the disclosure. The objects and advantages of the invention will be realized and attained by means of the elements and combinations particularly pointed out in the appended claims.

Consistent with the present disclosure an optical filter is provided which comprises a substrate. A first plurality of alternating first and second hard-coating layers are provided on the substrate, whereby the first layers have a first refractive index and the second layers have a second refractive index greater than the first refractive index. A second plurality of hard-coating layers, including a repeating sequence of a third layer, a first group layer, and a fourth layer is also provided on the substrate, such that each of the third layers has a third refractive index, each of the first group layers has a first effective refractive index, and each of the fourth layers has a fourth refractive index. The first effective refractive index is greater than the third refractive index and less than the fourth refractive index. Optionally, the first group layer may be comprised of two or more fourth sub-layers with refractive indexes different from the first effective refractive index, at least one of which is higher and another of which is lower than the effective refractive index, the combination of the sub-layers giving rise to the effective refractive index. In addition, a third plurality of hard-coating layers including a repeating sequence of a fifth layer, a second group layer, and a sixth layer is provided on the substrate. Each of the fifth layers has a fifth refractive index, each of the sixth layers has a sixth refractive index, and each of the second group layers has a second effective refractive index, which is greater than the fifth refractive index and less than the sixth refractive index. Optionally the second group layer may be comprised of two or more sub-layers with refractive indexes different from the second effective refractive index, at least one of which is higher and another of which is lower than the second effective refractive index, the combination of the sub-layers giving rise to the second effective refractive index. Further, the optical filter has a transmission characteristic as a function of wavelength such that the optical filter has: an average transmission greater than or equal to 80% over a first band of wavelengths, a first blocking level over a second band of wavelengths, a second blocking level over a third band of wavelengths, and a third blocking level over a fourth band of wavelengths. Moreover, each of the first, second, and third blocking levels has an average optical density (OD) greater than or equal to 5 and preferably greater than or equal to 6. The second, third and fourth bands of wavelengths are associated with the first, second, third pluralities of layers, respectively, and each of the first, second and third pluralities of layers is associated with a respective, first, second and third transmission characteristic. Each of the first, second and third transmission characteristics has an average transmission greater than or equal to 80% over the first band of wavelengths.

Consistent with a further aspect of the present disclosure, an optical system is provided which comprises an optical source configured to output light at a first wavelength. The light at the first wavelength is directed toward a sample, which emits light at a second wavelength in response to the light at the first wavelength. The optical system also includes an optical detector configured to sense the light at the second wavelength, and an optical filter configured such that the light at the second wavelength passes through the optical filter to the optical detector. The optical filter includes a first plurality of alternating first and second hard-coating layers provided on the substrate, whereby the first layers have a first refractive index and the second layers have a second refractive index greater than the first refractive index. A second plurality of hard-coating layers, including a repeating sequence of a third layer, a first group layer, and a fourth layer is also provided on the substrate, such that each of the third layers has a third refractive index, each of the first group layers has a first effective refractive index, and each of the fourth layers has a fourth refractive index. The first effective refractive index is greater than the third refractive index and less than the fourth refractive index. Optionally, the first group layer may be comprised of two or more fourth sub-layers with refractive indexes different from the first effective refractive index, at least one of which is higher and another of which is lower than the effective refractive index, the combination of the sub-layers giving rise to the effective refractive index. In addition, a third plurality of hard-coating layers including a repeating sequence of a fifth layer, a second group layer, and a sixth layer is provided on the substrate. Each of the fifth layers has a fifth refractive index, each of the sixth layers has a sixth refractive index, and each of the second group layers has a second effective refractive index, which is greater than the fifth refractive index and less than the sixth refractive index. Optionally the second group layer may be comprised of two or more sub-layers with refractive indexes different from the second effective refractive index, at least one of which is higher and another of which is lower than the second effective refractive index, the combination of the sub-layers giving rise to the second effective refractive index. Further, the optical filter has a transmission characteristic as a function of wavelength such that the optical filter has: a transmission greater than or equal to 80% over a first band of wavelengths, a first blocking level over a second band of wavelengths, a second blocking level over a third band of wavelengths, and a third blocking level over a fourth band of wavelengths. Moreover, each of the first, second, and third blocking levels has an average optical density (OD) greater than or equal to 6. The second, third and fourth bands of wavelengths are associated with the first, second, third pluralities of layers, respectively, and each of the first, second and third pluralities of layers is associated with a respective, first, second and third transmission characteristic. Each of the first, second and third transmission characteristics has an average transmission greater than or equal to 80% over the first band of wavelengths.

Further, consistent with the present disclosure, an optical filter is provided which has an average transmission greater than 80% over a first wavelength range extending from a first wavelength less than or equal to 380 nm and to a second wavelength between 650 nm and 720 nm. In addition, the optical filter has an average optical density (OD) greater than 5 over a second wavelength range extending from a third wavelength, which is greater than the second wavelength and is between 680 nm and 750 nm, to a fourth wavelength greater than or equal to 1100 nm.

Consistent with an additional aspect of the present disclosure, an optical filter is provided which has an average transmission greater than 80% over a first wavelength range extending from a first wavelength $\lambda_a$ to a second wavelength between $\lambda_a$ (650/380) and $\lambda_a$ (720/380). The optical filter also having an average optical density (OD) greater than 6 over a second wavelength range extending from a third wavelength, which is greater than the second wavelength and is between $\lambda_a$(680/380) and $\lambda_a$(750/380), to a fourth wavelength equal to $\lambda_a$(1100/380), wherein $\lambda_a$ is a wavelength between 300 nm and 600 nm.

It is to be understood that both the foregoing general description and the following detailed description are exemplary and explanatory only and are not restrictive of the invention, as claimed.

The accompanying drawings, which are incorporated in and constitute a part of this specification, illustrate embodiments consistent with the present disclosure and together with the description, serve to explain the principles of the disclosure.

DETAILED DESCRIPTION

Reference will now be made in detail to various exemplary embodiments of the present disclosure, examples of which are illustrated in the accompanying drawings. Wherever possible, the same reference numbers will be used throughout the drawings to refer to the same or like parts.

Figure 1A:
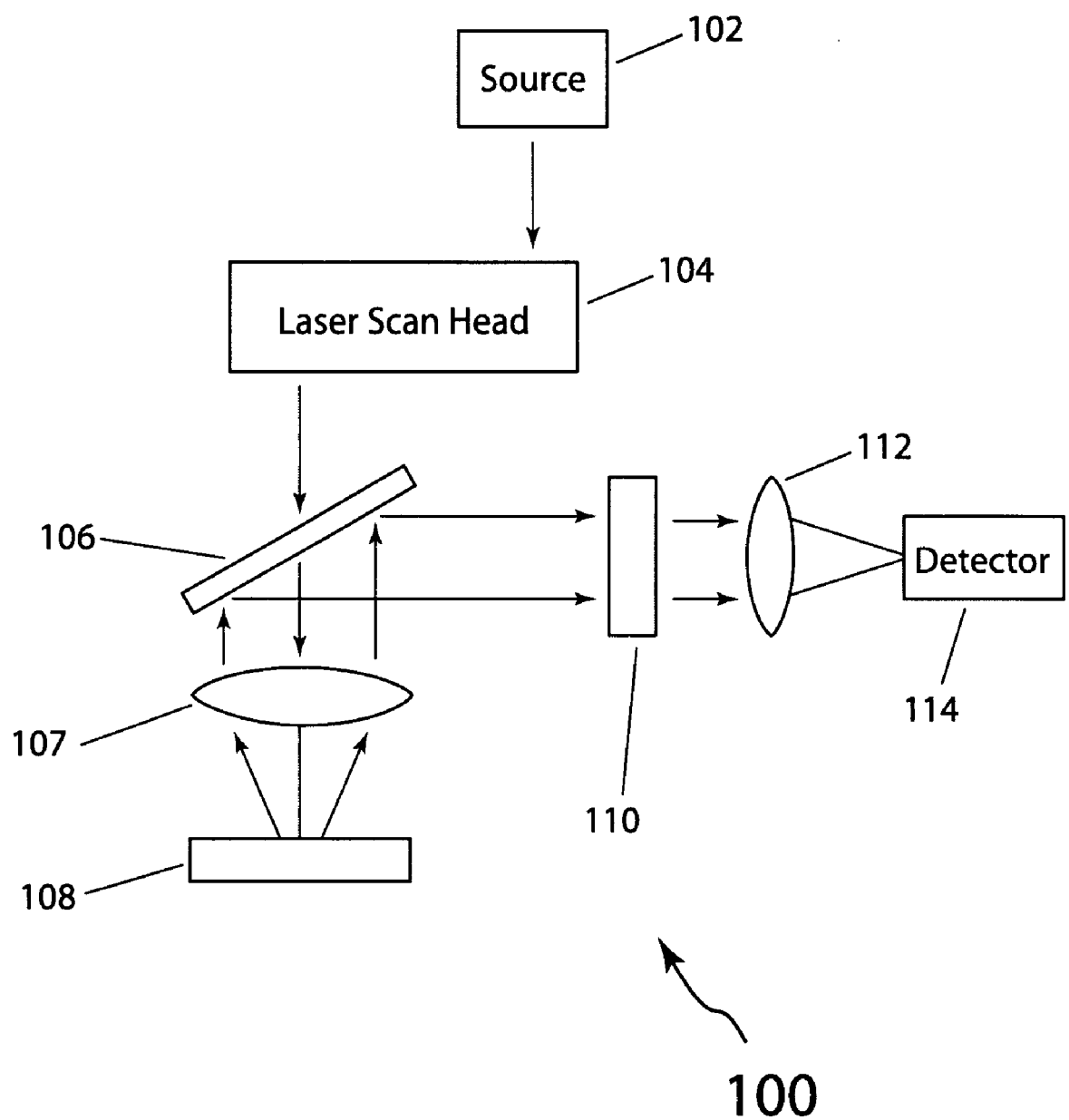
FIG. 1a is a block diagram of a multiphoton fluorescence system consistent with an aspect of the present disclosure.

FIG. 1a illustrates a system 100 consistent with an aspect of the present disclosure. System 100 includes an optical source 102, such as a conventional tunable Ti:Sapphire laser, which outputs light over a range of about 680 nm to 1100 nm. Light output from source 102 is fed to a laser scan head 104, which includes conventional optical components to scan the source light over sample 108. Before reaching sample 108, however, the source light passes through filter 106, which is typically a dichroic beam splitter, as well as lens 107, which is typically a multi-element microscope objective.

Light out from source 102 typically is at a wavelength and intensity such that multiphoton fluorescence of sample 108 takes place. Light emitted from sample 108 is collected by lens 107 and directed toward filter 106. A coating, to be described in greater detail below, is provided on filter 106, which reflects light at the emission wavelengths, but passes laser light directed to the sample and reflected off of the sample. The reflected emission light is passed through filter 110, such as an emission filter, which transmits the emission light, but substantially blocks light at other wavelengths, including the light output from source 102. After passing through filter 110, the emission light impinges directly onto optical detector 114, including, for example, a photodiode or photomultiplier tube, or, optionally, is focused by a lens 112 before impinging onto detector 114.

Figure 1B:
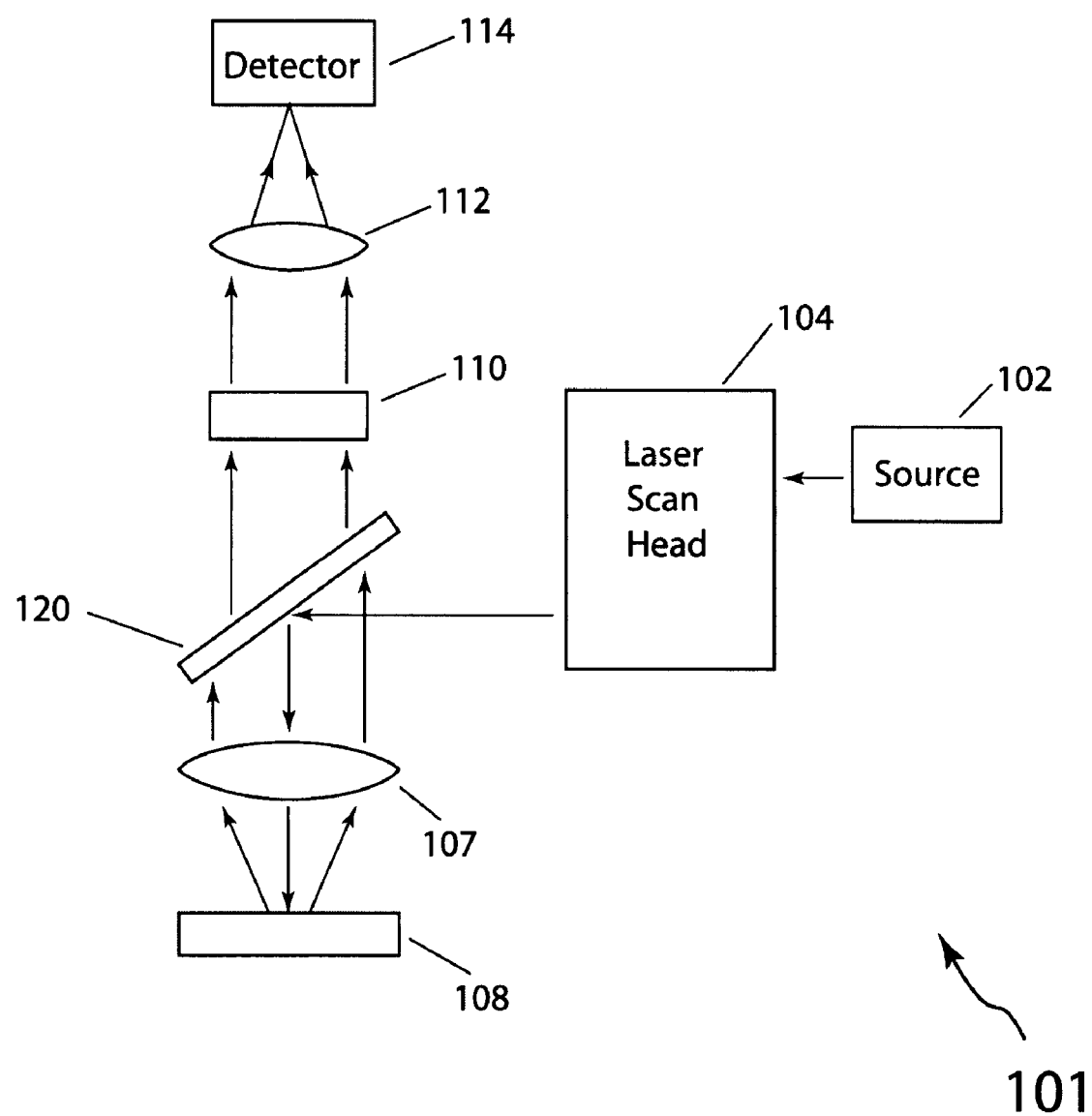
FIG. 1b is a block diagram of a multiphoton fluorescence system consistent with an additional aspect of the present disclosure.

FIG. 1b illustrates system 101 consistent with a further aspect of the present disclosure. System 101 includes components similar to those discussed above. In the example shown in FIG. 1b, however, laser light is reflected off of filter 120, typically a dichroic beamsplitter 120 (instead of passing through a dichroic beamsplitter as in FIG. 1a) and directed to sample 108. In addition, filter 110 receives emission light that has passed through filter 120, instead of receiving light that has been reflected off a dichroic beamsplitter, as in FIG. 1a.

Figure 2A:
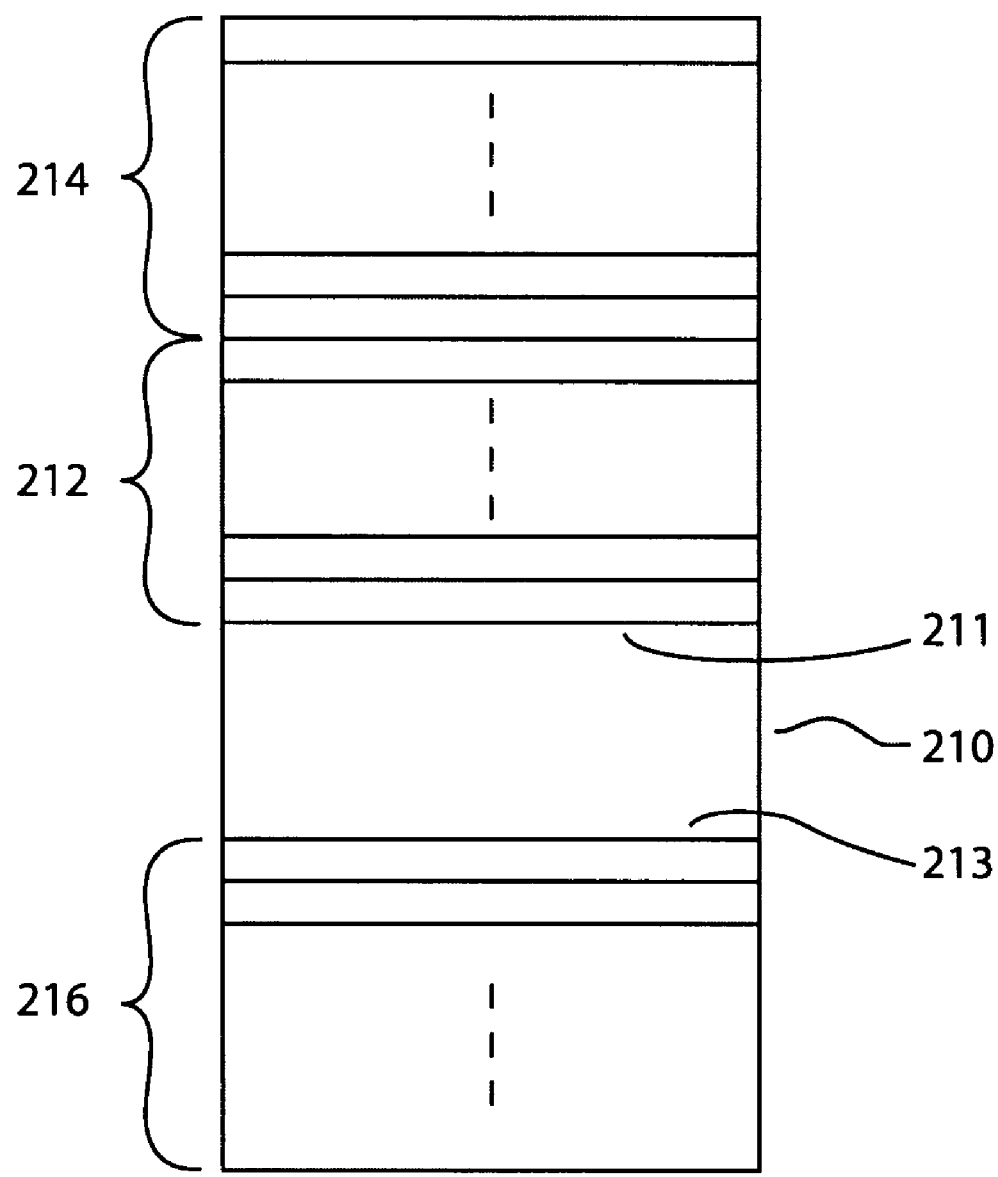
FIG. 2 illustrates a cross-sectional view of a filter consistent with the present disclosure.

FIG. 2a is a cross-sectional view of filter 110. Filter 110 includes a substrate 210, typically made of glass or other optically transparent material. A first plurality of layers 212 comprised of alternating first and second hard coating layers are provided on a first surface 211 of substrate 210. Such hard coating layers include, for example, $SiO_2$ (refractive index of about 1.5), $TiO_2$ (refractive index of about 2.4); $Ta_2O_5$ (refractive index of about 2.1); $Nb_2O_5$ (refractive index of about 2.2); and $HfO_2$ (refractive index of about of about 2.0). It should be noted that these indexes of refraction may vary slightly depending on the method and process of thin film deposition, and they also vary somewhat with wavelength. These layers and a method for depositing them are described in U.S. Pat. No. 6,809,859, which is incorporated by reference herein. A method for depositing hard coating layers is also described in U.S. Pat. No. 7,068,430, which is incorporated by reference herein. Other patents related to filters include: U.S. Pat. Nos. 7,123,416; 7,119,960; 6,894,838; and 6,611,378, each of which is incorporated herein by reference. A second plurality of layers 214 is provided on layers 212. The second plurality of layers includes a repeating sequence that is comprised of at least one layer each of a third layer, first group layer, and a fourth layer, each of which has a different refractive index from the others (i.e., a third refractive index, a first effective refractive index, and a fourth refractive index, respectively). A third plurality of layers 216 is further provided on second surface 213 of substrate 210. The third plurality of layers also includes a repeating sequence that is comprised of at least one layer each of a fifth layer, a second group layer and a sixth layer, each of which has a different refractive index from the others (i.e., fifth refractive index, a second effective refractive index, and sixth refractive index, respectively). As used herein, the phrase "group layer" means one layer or a plurality of sub-layers. Alternatively, the layers 214 may be provided on second surface 213 and layers 216 can be provided on layers 212.

Figure 2B:
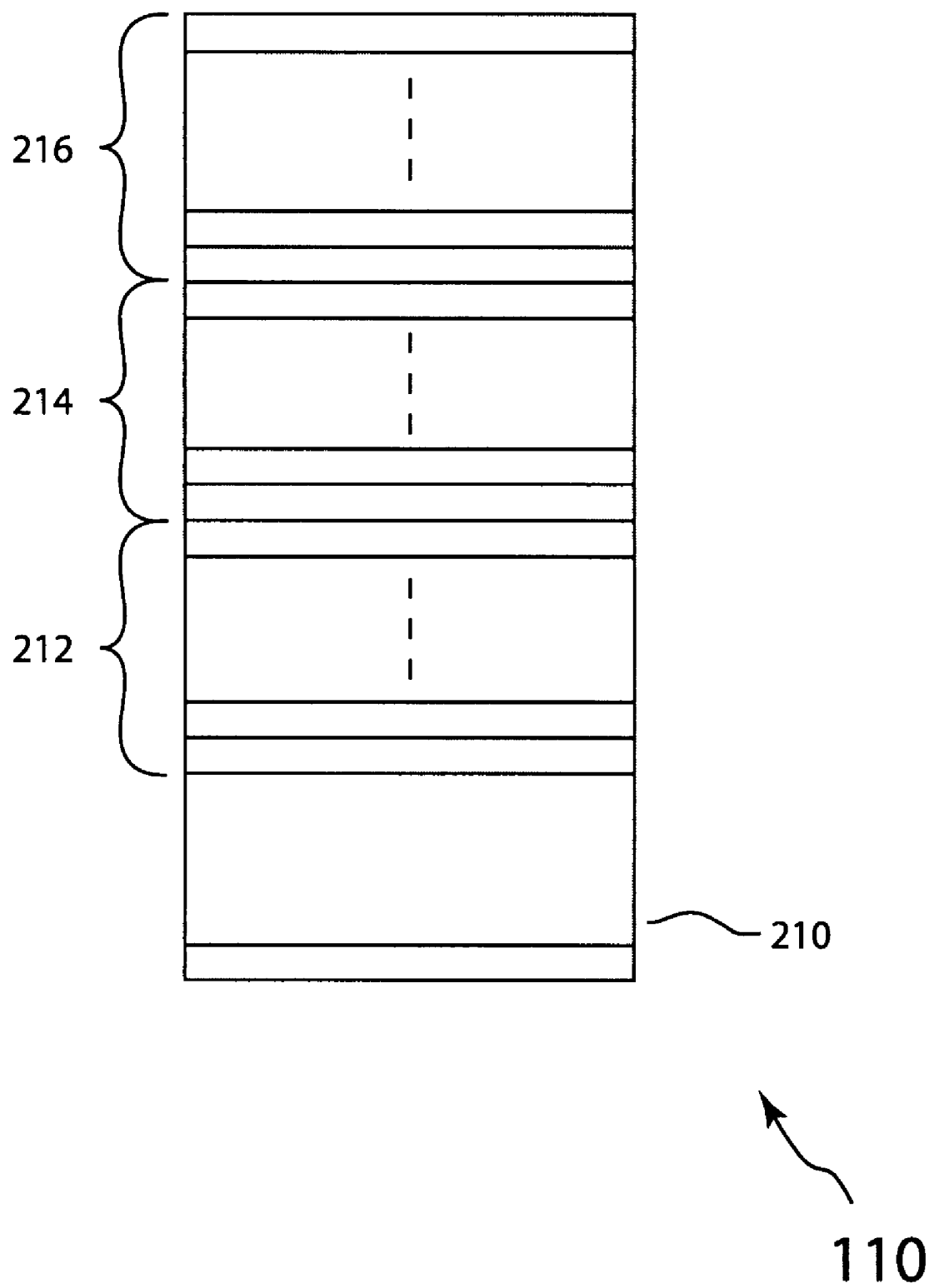

Consistent with a further aspect of the present disclosure, layers 212, 214 and 216 may be provided on the same surface, e.g., surface 211, of substrate 210 (see FIG. 2b). Layers 214 and 216 are discussed in greater detail below.

Figure 3:
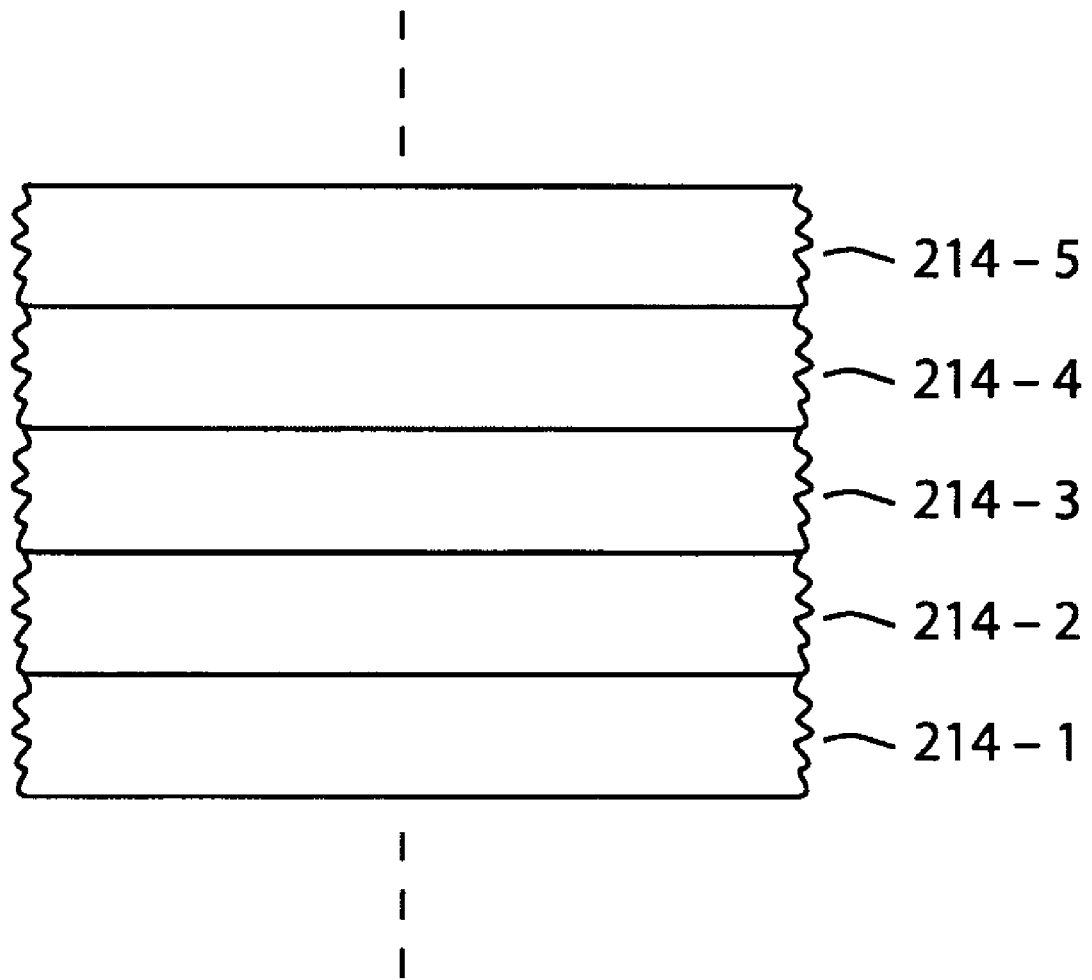
FIG. 3 illustrates an enlarged cross-sectional view of a portion of a filter shown consistent with the present disclosure.

FIG. 3 is an exemplary enlarged view of layers 214-1 to 214-5; this sequence is repeated throughout layers 214. In this example, layers 214-1 and 214-5 correspond to the third layers, layers 214-2 and 214-4 correspond to the first group layers, and layer 214-3 corresponds to the fourth layer, all of the second plurality of layers as described above. Layers 214-1 to 214-5 typically include hard coating layers. In order to provide adequate blocking at wavelengths greater than about 700 nm, the first group layers (layers 214-2 and 214-4) may have a refractive index between the refractive index of the third (214-1 and 214-5) and fourth (214-3) layers. In particular, this "intermediate-index layer" facilitates blocking with an average OD greater than 5 and preferably greater than 6 for wavelengths greater than 840 nm and less than 950 nm, while at the same time permitting high transmission in the short visible and near ultraviolet wavelength regions. Thus, for example, assuming a reference wavelength between 840 nm and 950 nm, and further assuming that layers 214-1 and 214-5 are $SiO_2$ and layer 214-3 is $Ta_2O_5$, and that each of layers 214-1 to 214-5 has a thickness of 0.4 times the quarter wavelength of the reference wavelength, the refractive index n of layers 214-2 and 214-4 satisfies $$n=\exp[a \ln(n_{SiO2})+(1-a)\ln(n_{Ta2O5})], \text{ where } a=0.382$$

For $n_{SiO2}$=1.5 and $n_{Ta2O5}$=2.1, n=1.8238 for a given reference wavelength within 840 nm to 950 nm. An optimal intermediate index value can be determined in a known manner, for example, as described in P. W. Baumeister, *Optical Coating Technology*, Section 5.3.5, the contents of which are incorporated herein by reference.

Figure 4A:
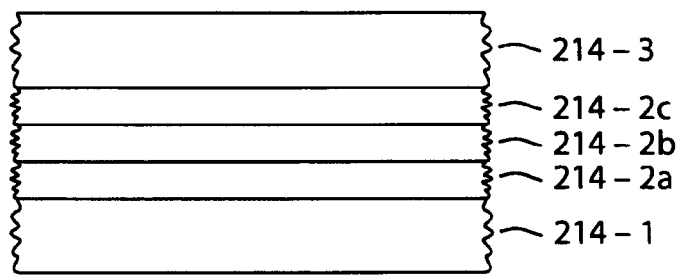
FIGS. 4a-4c illustrate an enlarged cross-sectional views of portions of a filter consistent with a further aspect of the present disclosure.

Because of practical limitations with materials, equipment, and processes, it is not always convenient to deposit intermediate-index layers with a refractive index sufficiently close to the required index to achieve the desired performance. As a result, an alternative approach is to replace each intermediate-index layer with a sequence of multiple, thinner "sub-layers" with indexes of refraction that are different from that of the intermediate-index layer, and which together approximate the optical performance of the single intermediate-index layer. Such a sequence of layers is known as a "Herpin equivalent layer." For example, each of the single, intermediate-index first group layers (214-2 and 214-4 in the above example) may be replaced by a sequence of two or more relatively thin sub-layers as illustrated in FIG. 4a. In this example, a three-sub-layer sequence comprised of layers 214-2a, 214-2b, and 214-2c is a symmetric structure with sub-layers 214-2a and 214-2c made of a material with a first sub-layer index and sub-layer 214-2b made of a material with a second sub-layer index. One of these sub-layer indexes is greater than that of the single, intermediate-index layer 214-2, and the other sub-layer index is less than that of the single, intermediate-index layer 214-2. The sequence of sub-layers, or Herpin equivalent layer, performs in an optical sense like the single intermediate-index layer. Accordingly, for example, if layers 214-1 and 214-5 include $SiO_2$, and 214-3 includes $Ta_2O_5$, the Herpin equivalent layers 214-2 and 214-4 can include relatively thin sub-layers of these same materials. As a result, layers 214 may be fabricated with two materials (e.g., $SiO_2$ and $Ta_2O_5$) instead of three. Herpin materials and effective Herpin equivalent layers are known and described in P. W. Baumeister, *Optical Coating Technology*, Section 2.6.7, the contents of which are incorporated herein by reference.

Figure 4B:
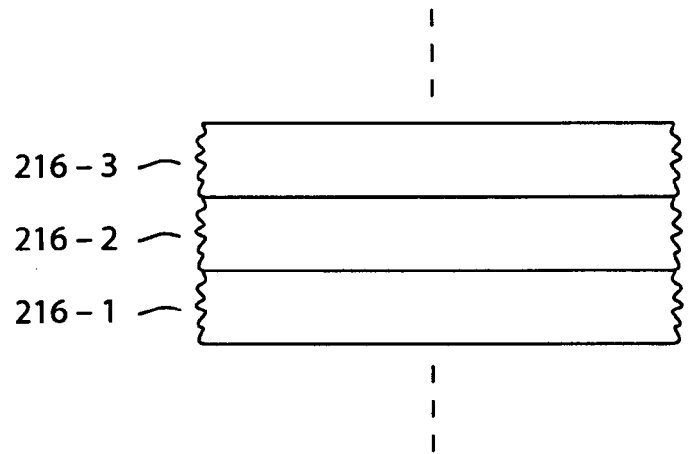
Figure 4C:
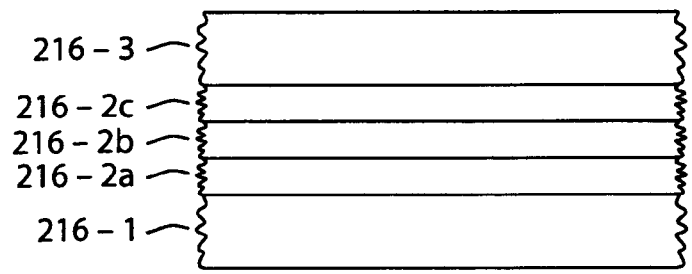

In a similar manner, as shown in FIG. 4b, layers 216 include a repeating sequence of layers (a sixth layer 216-1, a second group layer 216-2, and a sixth layer 216-3), with the second group layer 216-2, having an effective refractive index or intermediate-index, sandwiched between higher (sixth, 216-3) and lower (fifth, 216-1) refractive index layers similar to that shown in FIG. 3. Additionally, the second group layer 216-2 in layers 216 may be replaced by a Herpin equivalent layer comprised of third and fourth sub-layers. For example, as shown in FIG. 4c, a three-sub-layer sequence (similar to that shown in FIG. 4a) including a symmetric structure of thin sub-layers 216-2a, 216-2b, and 216-2 may be provided. In this example, layers 216-2a and 216-2c are made of a material with a desired sub-layer index and sub layer 216-2b is made of material having another desired sub-layer index. The intermediate-index layer associated with layers 216, however, has a corresponding reference wavelength between 950 nm and 1100 nm, and thus has a different optimal refractive index value than that of the intermediate-index layer associated with layers 214.

Due to the presence of the Herpin equivalent layers in layers 214 and 216 a relatively large number of layers is often formed on substrate 210. In addition, many of the Herpin sub-layers are relatively thin and have thicknesses less than 20 nm. Layer deposition techniques as described in U.S. Pat. No. 7,068,430 may be employed in order to form layers 212, 214 and 216 shown in FIGS. 2a and 2b, and discussed above.

Other combinations of hard coating layers may also be provided. For example, each of the second layers, each of the fourth layers, each of the sixth layers, each of the second sub-layers, and each of the fourth sub-layers may include hafnium oxide ($HfO_2$). Alternatively, each of the second layers, each of the fourth layers, each of the sixth layers, each of the second sub-layers, and each of the fourth sub-layers may include niobium pentoxide ($Nb_2O_5$), titanium dioxide ($TiO_2$), or aluminum pentoxide ($Al_2O_5$).

Figure 5A:
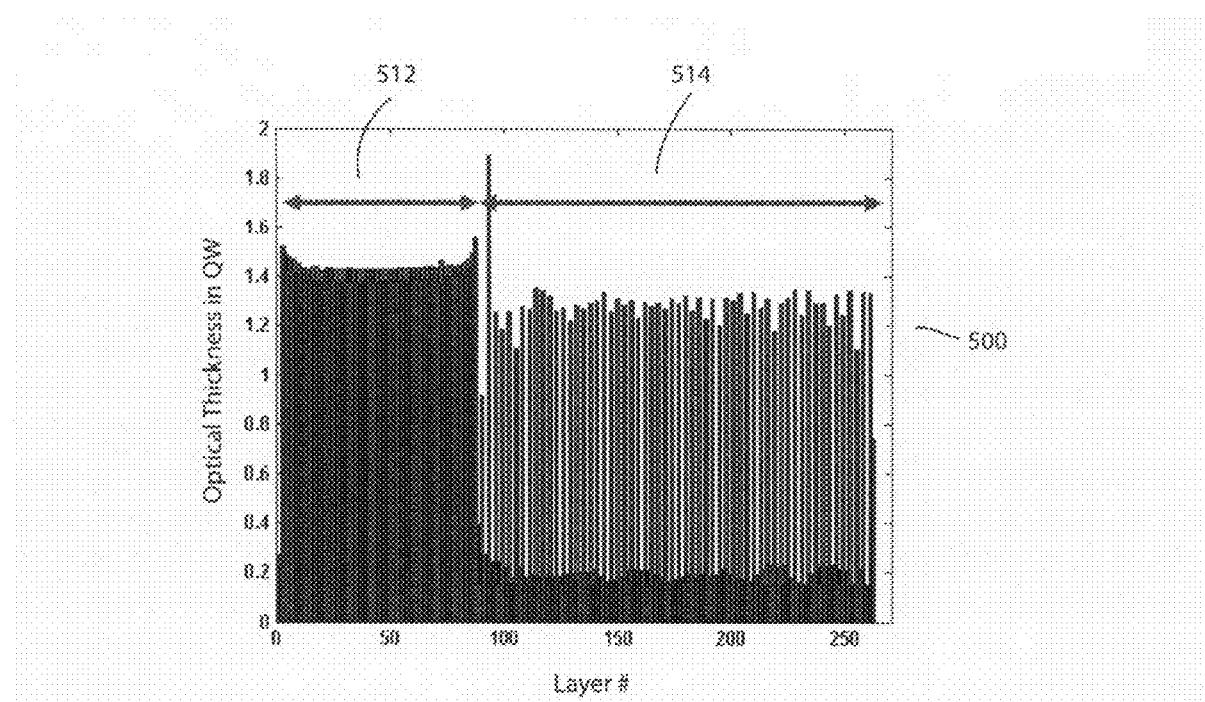
FIGS. 5a and 5b illustrate bar charts indicating various layer thicknesses of a filter consistent with the present disclosure.
Figure 5B:
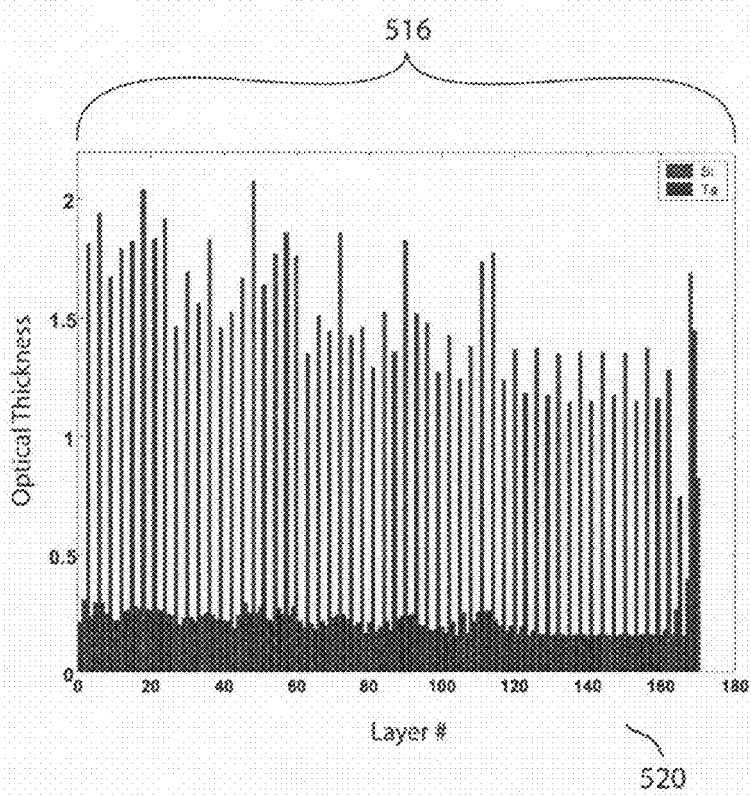

FIGS. 5a and 5b are bar charts indicating exemplary optical thicknesses (in quarter wavelengths of a 550 nm reference wavelength) of layers 212 (see range 512, FIG. 5a), layers 214 (see range 514, FIG. 5a), and layers 216 (see range 516, FIG. 5b).

Figure 6A:
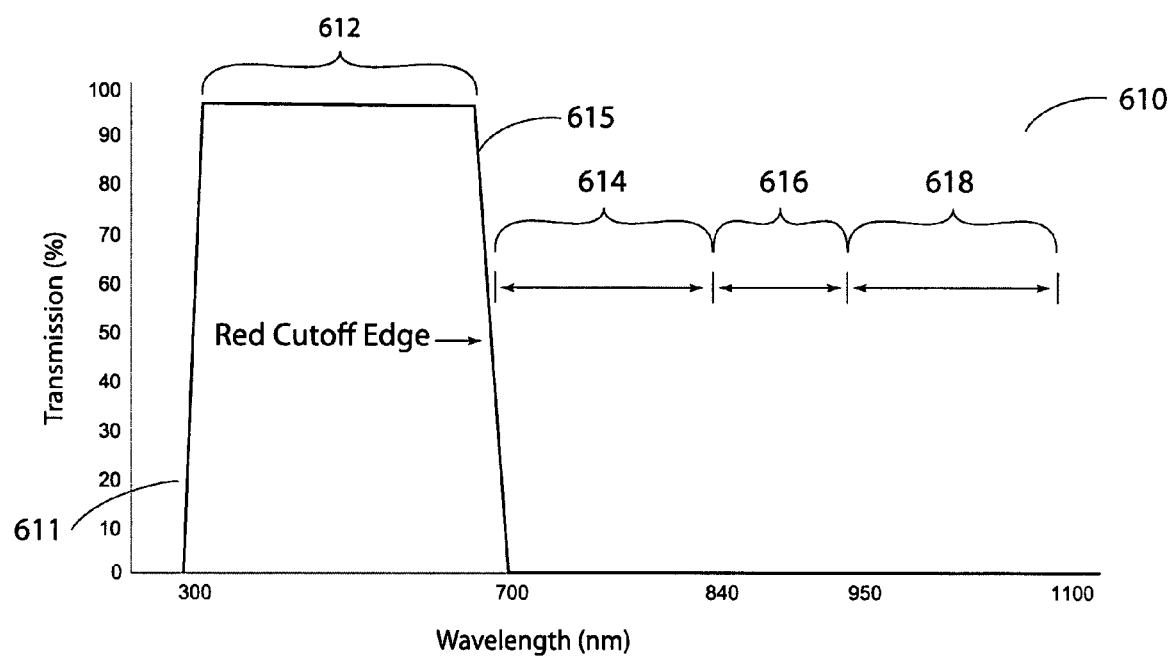
FIGS. 6a-6e, 7, 8, 9a, 9b, 10a, and 10b illustrate transmission characteristics of consistent with the present disclosure.

FIG. 6a illustrates a transmission characteristic 610 as a function of wavelength associated with filter 110. Transmission characteristic 610 has a relatively high average transmission, e.g., greater than 80% and preferably greater than 90% over a transmission band or first band of wavelengths 612, extending, for example, from about 300 nm to about 700 nm, corresponding to the range of wavelengths of emitted light typically generated in a multiphoton fluorescent system. Filter 110 also has first, second and third blocking levels or an amount of optical blocking with an OD greater than 5 and preferably greater than or equal to 6 over second 614 (about 700 nm to about 840 nm), third 616 (about 840 nm to about 950 nm), and fourth 618 (about 950 nm to about 1100 nm) wavelength bands, for example. The second, third and fourth wavelength bands collectively correspond, for example, to the range of wavelengths associated with the light output from a Ti:Sapphire laser. The presence of the intermediate-index layers or Herpin equivalent layers in layers 214 and 216 substantially reduces the second and third order stop bands in the wavelength band of 300 nm to 700 nm and provides improved transmission in this spectral region, as noted above.

Figure 6B:
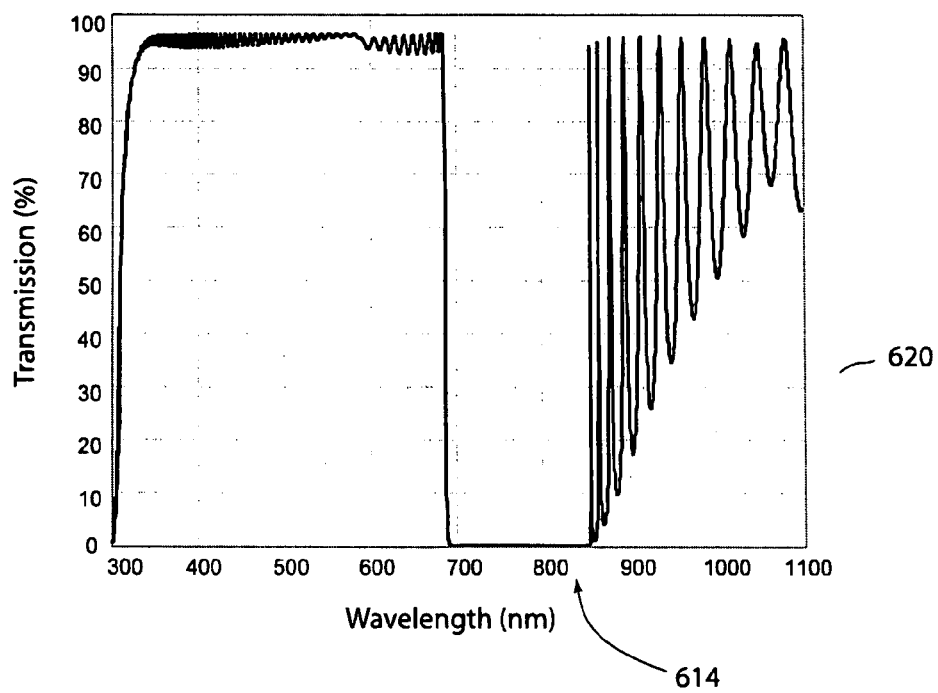
Figure 6C:
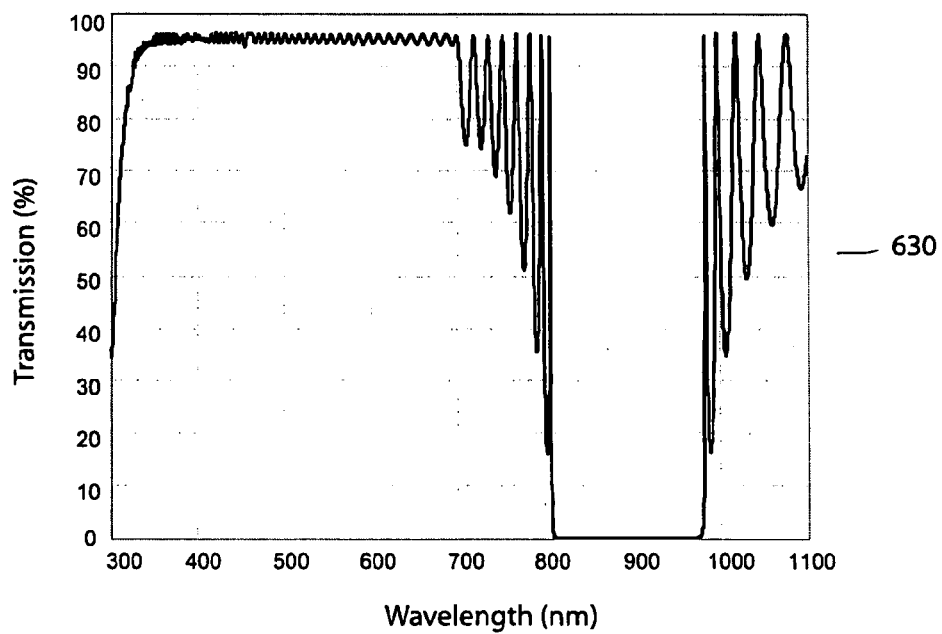
Figure 6D:
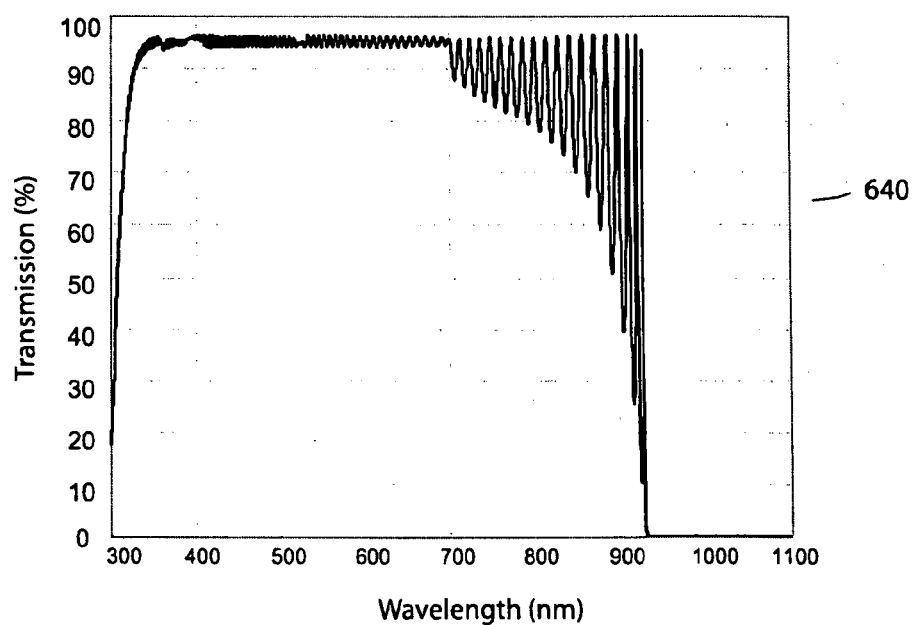

FIGS. 6b, 6c, and 6d illustrate transmission characteristics 620, 630, and 640 having corresponding wavelength blocking bands 614, 616, and 618, respectively. Wavelength blocking bands 614, 616, and 618 are associated with layers 212, 214, and 216, respectively.

Figure 6E:
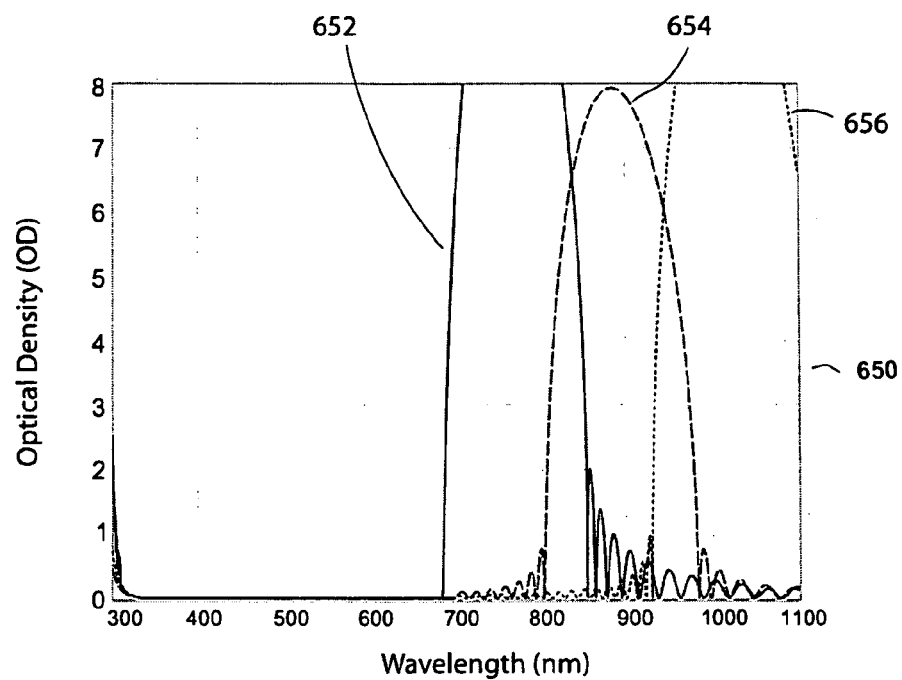

FIG. 6e illustrates multiple transmission characteristics corresponding to those shown in FIGS. 6b, 6c, and 6d. In particular, solid curve 52 corresponds to transmission characteristic 620 and layers 212, dashed curve 654 corresponds to transmission characteristic 630 and layers 214, and dotted curve 656 corresponds to transmission characteristic 640 and layers 216. In FIG. 6e, optical density (OD) is plotted vs. wavelength instead of linear transmission. Accordingly, the resulting transmission characteristic of filter 110 having layers 212, 214, and 216 has an OD greater than 5 and preferably greater than 6 over wavelength blocking bands 614, 616, and 618.

An additional example of a filter 110 having the structure described above has an average transmission greater than 80% over a first wavelength range extending from a first wavelength equal to 380 nm to a second wavelength between 650 nm and 720 nm. This optical filter also has an average optical density (OD) greater than 6 over a second wavelength range extending from a third wavelength, which is greater than the second wavelength and is between 680 nm and 750 nm, to a fourth wavelength equal to 1100 nm. The third wavelength exceeds the second wavelength by an amount less than or equal to 30 nm. Preferably, the optical filter has an average OD greater than 8 over a third wavelength range extending from the third wavelength to 1040 nm. In addition, the optical filter may have an average transmission greater than 90% over a fifth wavelength range wavelength range of 400 nm to 650 nm.

It is noted that relatively precise monitoring may be required to deposit layers 212 and 214 on surface 211 of substrate 210. Cutoff edge 615 (see FIG. 6a), however, is not attributable to layers 216 and thus variations in layers 216 will not significantly impact the performance of filter 110. In addition, if $Ta_2O_5$ is used, a third order stop band in the high transmission band of 300 nm to 700 nm tends to be shifted to a longer wavelength ("red shifted") than one might initially calculate by simply dividing the first-order stop band wavelength by three, due to material dispersion of $Ta_2O_5$ at ultraviolet wavelengths. If cutoff edge 615 is to be shifted to higher wavelengths, the UV edge 619 (see FIG. 6a) must be typically also shifted to higher wavelengths. However, when using $Ta_2O_5$, UV edge 611 is, in any event, shifted to 330 nm due primarily to absorption associated with this material. Accordingly, cutoff edge 615 can be tuned up to 730 nm by deposition of an appropriate number of layers, each with suitable thicknesses, without substantially affecting UV transmission through filter 210.

Consistent with a further aspect of the present disclosure, layers 212 can also include either intermediate-index or Herpin equivalent layers, but with increased complexity, thus possibly requiring four separate filter designs on two substrates.

Figure 7:
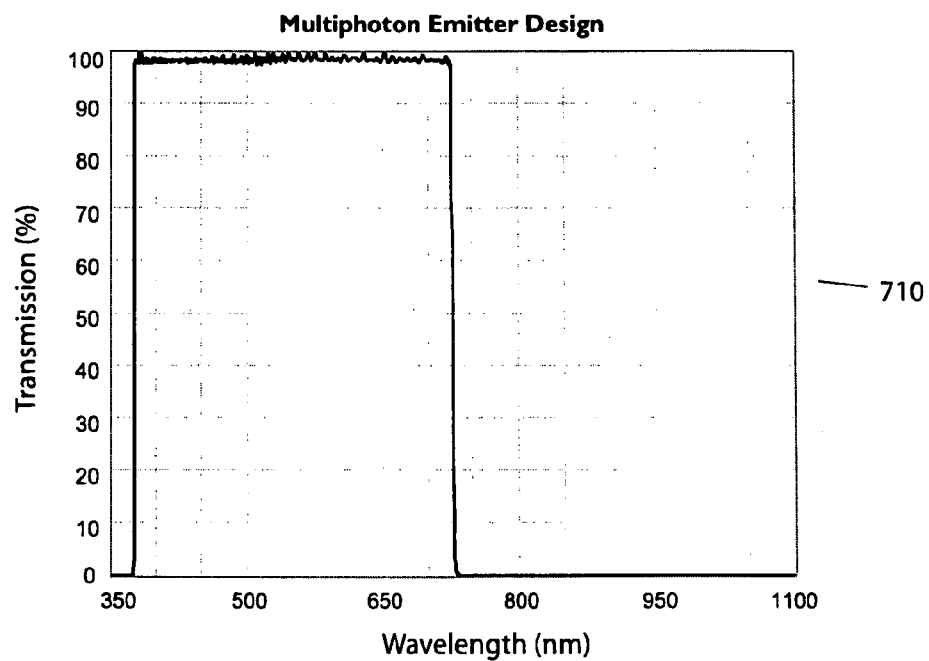
Figure 8:
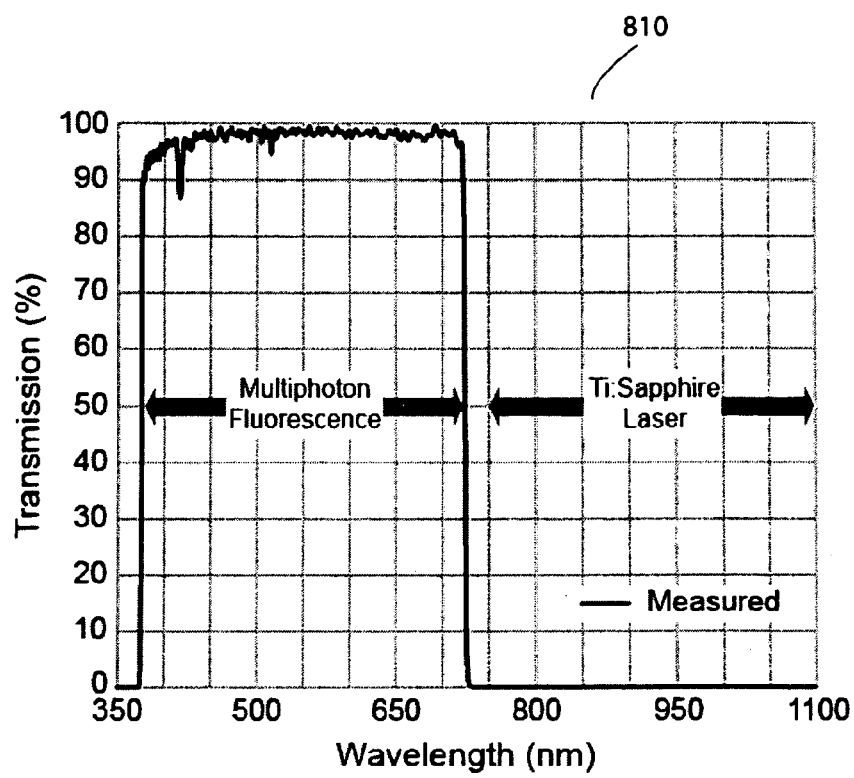

Further exemplary transmission characteristics 710 and 810 are shown in FIGS. 7 and 8, respectively. Layer structures of the filters having the transmission characteristics shown in FIGS. 7 and 8 are presented below in Table 1. The total thickness of the layers, as well as the thickness of the individual layers, deposited on each side ("Side 1" and "Side 2") of substrate 210 are also listed in Table 1.

TABLE 1

| | Total Thickness (um): 14.134348781 Side 1 | | Total Thickness (um): 8.955962653 Side 2 | |
|---|---|---|---|---|
| Layer # | Material | Thickness (nm) | Material | Thickness (nm) |
| 1 | Ta2O5 | 15.00 | Ta2O5 | 15.00 |
| 2 | SiO2 | 37.62 | SiO2 | 35.05 |
| 3 | Ta2O5 | 124.97 | Ta2O5 | 118.14 |
| 4 | SiO2 | 168.46 | SiO2 | 156.51 |
| 5 | Ta2O5 | 119.76 | Ta2O5 | 105.19 |
| 6 | SiO2 | 172.44 | SiO2 | 147.07 |
| 7 | Ta2O5 | 121.00 | Ta2O5 | 97.53 |
| 8 | SiO2 | 174.18 | SiO2 | 144.18 |
| 9 | Ta2O5 | 121.15 | Ta2O5 | 97.44 |
| 10 | SiO2 | 174.47 | SiO2 | 141.44 |
| 11 | Ta2O5 | 121.22 | Ta2O5 | 95.69 |
| 12 | SiO2 | 174.96 | SiO2 | 140.55 |
| 13 | Ta2O5 | 121.47 | Ta2O5 | 95.56 |
| 14 | SiO2 | 175.24 | SiO2 | 140.28 |
| 15 | Ta2O5 | 121.72 | Ta2O5 | 94.98 |
| 16 | SiO2 | 174.87 | SiO2 | 140.33 |
| 17 | Ta2O5 | 121.72 | Ta2O5 | 95.12 |
| 18 | SiO2 | 174.97 | SiO2 | 139.06 |
| 19 | Ta2O5 | 121.86 | Ta2O5 | 94.67 |
| 20 | SiO2 | 174.99 | SiO2 | 139.79 |
| 21 | Ta2O5 | 121.80 | Ta2O5 | 94.56 |
| 22 | SiO2 | 175.07 | SiO2 | 139.61 |
| 23 | Ta2O5 | 121.96 | Ta2O5 | 94.42 |
| 24 | SiO2 | 175.06 | SiO2 | 139.11 |
| 25 | Ta2O5 | 121.76 | Ta2O5 | 94.15 |
| 26 | SiO2 | 175.06 | SiO2 | 139.39 |
| 27 | Ta2O5 | 121.88 | Ta2O5 | 94.12 |
| 28 | SiO2 | 175.12 | SiO2 | 139.13 |
| 29 | Ta2O5 | 122.03 | Ta2O5 | 94.15 |
| 30 | SiO2 | 175.29 | SiO2 | 139.01 |
| 31 | Ta2O5 | 121.60 | Ta2O5 | 94.34 |
| 32 | SiO2 | 175.37 | SiO2 | 138.82 |
| 33 | Ta2O5 | 121.84 | Ta2O5 | 94.15 |
| 34 | SiO2 | 174.97 | SiO2 | 138.74 |
| 35 | Ta2O5 | 122.13 | Ta2O5 | 94.58 |
| 36 | SiO2 | 176.07 | SiO2 | 139.27 |
| 37 | Ta2O5 | 120.19 | Ta2O5 | 94.17 |
| 38 | SiO2 | 176.91 | SiO2 | 139.23 |
| 39 | Ta2O5 | 121.67 | Ta2O5 | 94.19 |
| 40 | SiO2 | 174.51 | SiO2 | 138.88 |
| 41 | Ta2O5 | 122.25 | Ta2O5 | 93.58 |
| 42 | SiO2 | 174.90 | SiO2 | 139.40 |
| 43 | Ta2O5 | 122.12 | Ta2O5 | 94.36 |
| 44 | SiO2 | 174.93 | SiO2 | 138.89 |
| 45 | Ta2O5 | 121.80 | Ta2O5 | 93.85 |
| 46 | SiO2 | 174.42 | SiO2 | 139.21 |

TABLE 1-continued

| | Total Thickness (um): 14.134348781 Side 1 | | Total Thickness (um): 8.955962653 Side 2 | |
|---|---|---|---|---|
| Layer # | Material | Thickness (nm) | Material | Thickness (nm) |
| 47 | Ta2O5 | 121.59 | Ta2O5 | 94.57 |
| 48 | SiO2 | 174.95 | SiO2 | 138.67 |
| 49 | Ta2O5 | 121.30 | Ta2O5 | 94.24 |
| 50 | SiO2 | 174.08 | SiO2 | 139.57 |
| 51 | Ta2O5 | 120.55 | Ta2O5 | 94.14 |
| 52 | SiO2 | 172.96 | SiO2 | 138.58 |
| 53 | Ta2O5 | 119.28 | Ta2O5 | 94.04 |
| 54 | SiO2 | 169.12 | SiO2 | 139.18 |
| 55 | Ta2O5 | 114.13 | Ta2O5 | 94.41 |
| 56 | SiO2 | 157.67 | SiO2 | 139.25 |
| 57 | Ta2O5 | 104.42 | Ta2O5 | 94.00 |
| 58 | SiO2 | 151.29 | SiO2 | 139.54 |
| 59 | Ta2O5 | 101.85 | Ta2O5 | 94.09 |
| 60 | SiO2 | 146.36 | SiO2 | 139.26 |
| 61 | Ta2O5 | 101.45 | Ta2O5 | 94.69 |
| 62 | SiO2 | 149.51 | SiO2 | 139.25 |
| 63 | Ta2O5 | 101.95 | Ta2O5 | 94.61 |
| 64 | SiO2 | 154.08 | SiO2 | 139.07 |
| 65 | Ta2O5 | 111.29 | Ta2O5 | 94.23 |
| 66 | SiO2 | 166.30 | SiO2 | 140.22 |
| 67 | Ta2O5 | 115.10 | Ta2O5 | 94.99 |
| 68 | SiO2 | 164.89 | SiO2 | 139.85 |
| 69 | Ta2O5 | 109.29 | Ta2O5 | 95.37 |
| 70 | SiO2 | 151.71 | SiO2 | 140.49 |
| 71 | Ta2O5 | 100.93 | Ta2O5 | 95.57 |
| 72 | SiO2 | 146.78 | SiO2 | 142.45 |
| 73 | Ta2O5 | 99.52 | Ta2O5 | 95.13 |
| 74 | SiO2 | 147.05 | SiO2 | 142.88 |
| 75 | Ta2O5 | 101.17 | Ta2O5 | 101.51 |
| 76 | SiO2 | 149.20 | SiO2 | 146.15 |
| 77 | Ta2O5 | 105.83 | Ta2O5 | 90.91 |
| 78 | SiO2 | 161.19 | SiO2 | 68.14 |
| 79 | Ta2O5 | 113.83 | | |
| 80 | SiO2 | 165.23 | | |
| 81 | Ta2O5 | 111.74 | | |
| 82 | SiO2 | 155.54 | | |
| 83 | Ta2O5 | 101.83 | | |
| 84 | SiO2 | 147.65 | | |
| 85 | Ta2O5 | 100.08 | | |
| 86 | SiO2 | 145.31 | | |
| 87 | Ta2O5 | 100.05 | | |
| 88 | SiO2 | 148.21 | | |
| 89 | Ta2O5 | 102.60 | | |
| 90 | SiO2 | 155.89 | | |
| 91 | Ta2O5 | 112.19 | | |
| 92 | SiO2 | 165.49 | | |
| 93 | Ta2O5 | 114.20 | | |
| 94 | SiO2 | 161.88 | | |
| 95 | Ta2O5 | 106.20 | | |
| 96 | SiO2 | 148.70 | | |
| 97 | Ta2O5 | 101.34 | | |
| 98 | SiO2 | 147.85 | | |
| 99 | Ta2O5 | 98.73 | | |
| 100 | SiO2 | 147.67 | | |
| 101 | Ta2O5 | 103.09 | | |
| 102 | SiO2 | 148.87 | | |
| 103 | Ta2O5 | 98.04 | | |
| 104 | SiO2 | 72.61 | | |

Figure 9A:
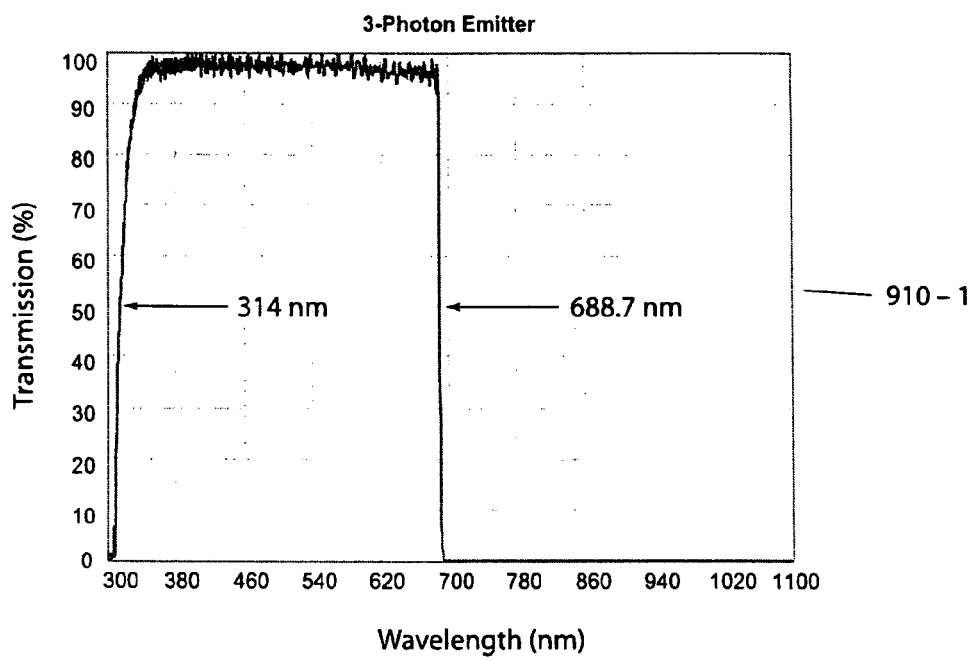
Figure 9B:
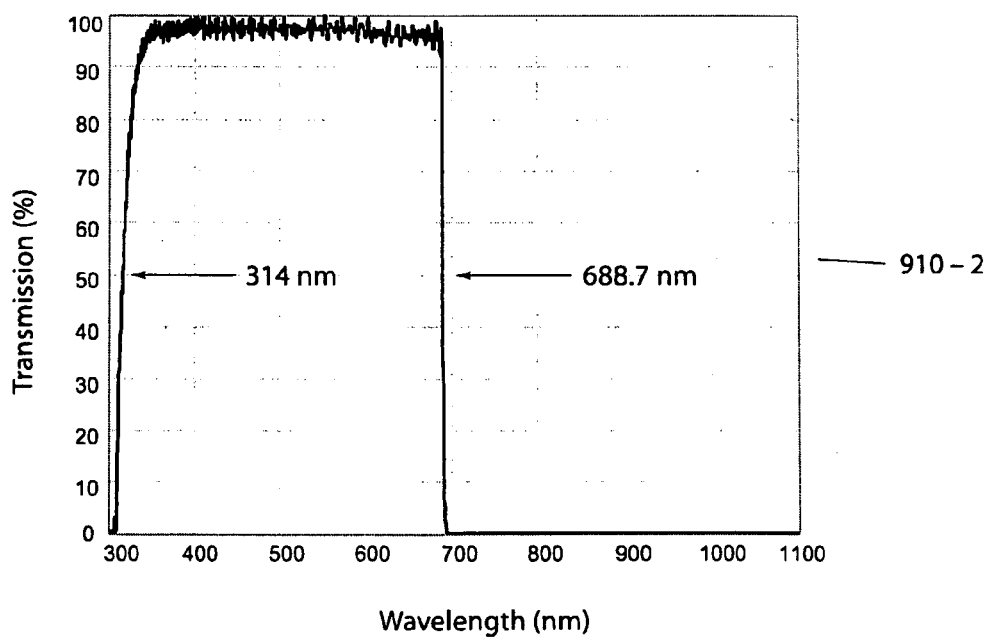
Figure 10A:
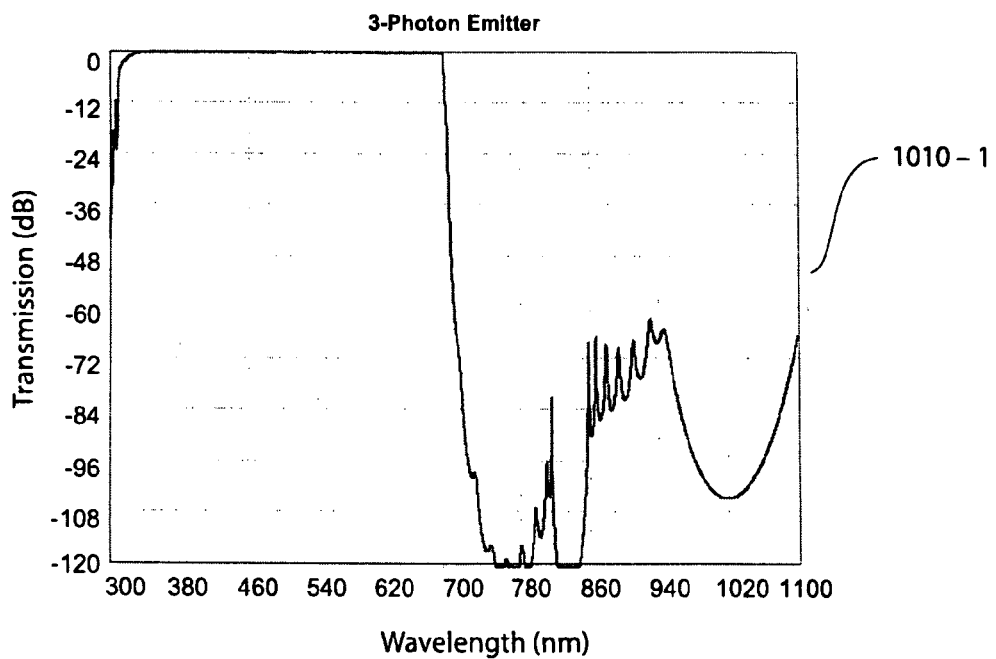
Figure 10B:
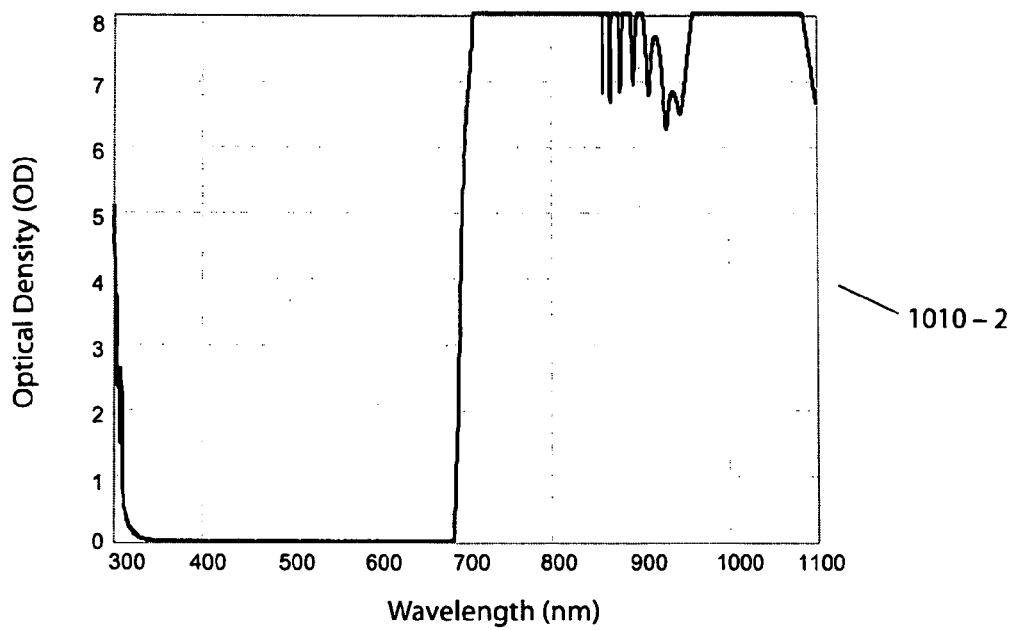
Figure 11:
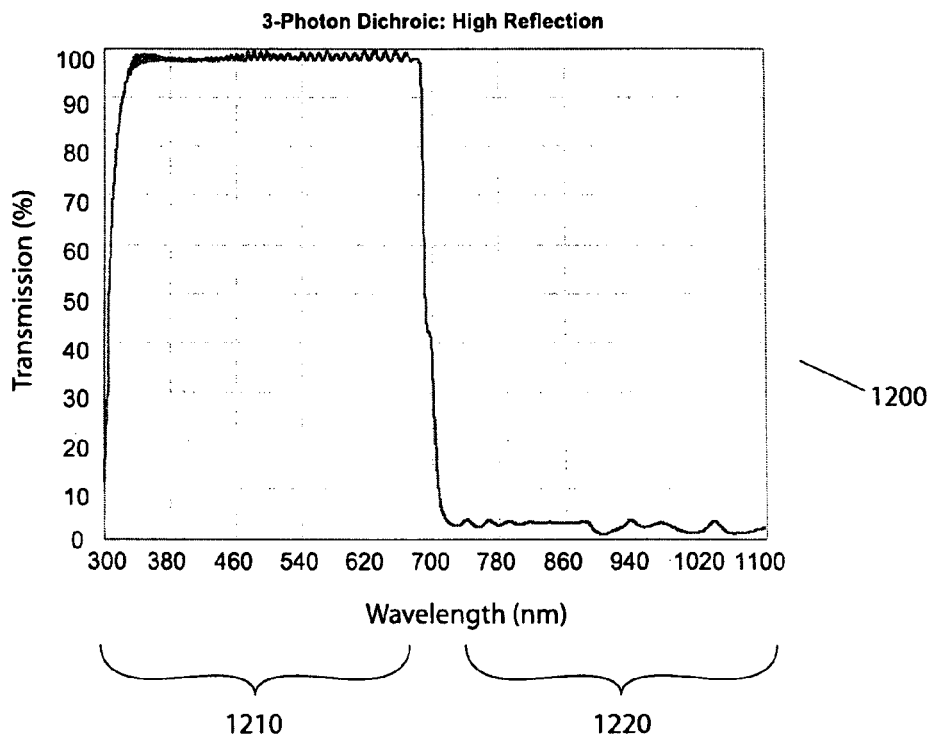
FIGS. 11-16 illustrate transmission characteristics of consistent with additional aspects of the present disclosure.

FIG. 9 illustrates transmission characteristic 910-1 of a three photon emission filter. In FIG. 9, linear transmission is plotted vs. wavelength. FIG. 10 depicts optical density (OD) characteristic 1010-1 of the three photon emission filter shown in FIG. 9. FIG. 11 illustrates another exemplary transmission characteristic of a three photon dichroic short wave pass ("SWP") filter.

Layer structures associated with the filters having the characteristics shown in FIGS. 9, 10, and 11 are provided below in Table 2. Columns labeled "Side 1" and "Side 2" indicate the layers, and their corresponding thicknesses, which are provided on first and second sides of a substrate, such as substrate 210 discussed above in regard to FIG. 2a.

TABLE 2

| | Three-Photon Emitter (FIGS. 9a, 9b, 10a, and 10b) | | | | Three-Photon SWP Dichroic (FIG. 11) | |
|---|---|---|---|---|---|---|
| | Side 1 | | Side 2 | | | |
| Layer # | Material Substrate | Thickness (nm) | Material Substrate | Thickness (nm) | Material Substrate | Thickness (nm) |
| 1 | Ta2O5 | 12.51 | Ta2O5 | 14.02 | Ta2O5 | 13.44 |
| 2 | SiO2 | 22.67 | SiO2 | 24.75 | SiO2 | 28.49 |
| 3 | Ta2O5 | 99.75 | Ta2O5 | 98.18 | Ta2O5 | 116.88 |
| 4 | SiO2 | 18.80 | SiO2 | 137.92 | SiO2 | 21.88 |
| 5 | Ta2O5 | 13.79 | Ta2O5 | 91.93 | Ta2O5 | 18.91 |
| 6 | SiO2 | 127.04 | SiO2 | 136.77 | SiO2 | 179.22 |
| 7 | Ta2O5 | 12.12 | Ta2O5 | 91.55 | Ta2O5 | 18.77 |
| 8 | SiO2 | 20.46 | SiO2 | 135.74 | SiO2 | 22.90 |
| 9 | Ta2O5 | 93.20 | Ta2O5 | 90.99 | Ta2O5 | 107.96 |
| 10 | SiO2 | 19.86 | SiO2 | 134.38 | SiO2 | 20.33 |
| 11 | Ta2O5 | 12.29 | Ta2O5 | 89.86 | Ta2O5 | 14.08 |
| 12 | SiO2 | 137.59 | SiO2 | 132.55 | SiO2 | 165.95 |
| 13 | Ta2O5 | 13.24 | Ta2O5 | 88.84 | Ta2O5 | 16.39 |
| 14 | SiO2 | 19.07 | SiO2 | 132.27 | SiO2 | 24.47 |
| 15 | Ta2O5 | 95.89 | Ta2O5 | 89.05 | Ta2O5 | 117.40 |
| 16 | SiO2 | 17.68 | SiO2 | 132.93 | SiO2 | 25.92 |
| 17 | Ta2O5 | 13.37 | Ta2O5 | 89.41 | Ta2O5 | 17.29 |
| 18 | SiO2 | 138.84 | SiO2 | 133.17 | SiO2 | 188.31 |
| 19 | Ta2O5 | 12.60 | Ta2O5 | 88.94 | Ta2O5 | 17.32 |
| 20 | SiO2 | 19.41 | SiO2 | 131.85 | SiO2 | 24.51 |
| 21 | Ta2O5 | 91.32 | Ta2O5 | 88.70 | Ta2O5 | 117.87 |
| 22 | SiO2 | 17.95 | SiO2 | 132.29 | SiO2 | 24.54 |
| 23 | Ta2O5 | 13.59 | Ta2O5 | 88.82 | Ta2O5 | 16.79 |
| 24 | SiO2 | 137.10 | SiO2 | 132.79 | SiO2 | 176.96 |
| 25 | Ta2O5 | 13.59 | Ta2O5 | 89.00 | Ta2O5 | 15.68 |
| 26 | SiO2 | 18.86 | SiO2 | 132.40 | SiO2 | 21.71 |
| 27 | Ta2O5 | 94.69 | Ta2O5 | 88.78 | Ta2O5 | 94.27 |
| 28 | SiO2 | 18.98 | SiO2 | 131.97 | SiO2 | 18.54 |
| 29 | Ta2O5 | 12.83 | Ta2O5 | 88.53 | Ta2O5 | 14.57 |
| 30 | SiO2 | 137.64 | SiO2 | 132.25 | SiO2 | 156.63 |
| 31 | Ta2O5 | 12.74 | Ta2O5 | 88.87 | Ta2O5 | 14.86 |
| 32 | SiO2 | 19.30 | SiO2 | 132.46 | SiO2 | 19.48 |
| 33 | Ta2O5 | 93.88 | Ta2O5 | 88.92 | Ta2O5 | 100.41 |
| 34 | SiO2 | 17.99 | SiO2 | 132.14 | SiO2 | 21.89 |
| 35 | Ta2O5 | 13.18 | Ta2O5 | 88.70 | Ta2O5 | 16.07 |
| 36 | SiO2 | 136.43 | SiO2 | 131.93 | SiO2 | 169.48 |
| 37 | Ta2O5 | 13.13 | Ta2O5 | 88.79 | Ta2O5 | 15.46 |
| 38 | SiO2 | 19.20 | SiO2 | 132.37 | SiO2 | 20.33 |
| 39 | Ta2O5 | 93.60 | Ta2O5 | 88.94 | Ta2O5 | 93.84 |
| 40 | SiO2 | 18.39 | SiO2 | 132.30 | SiO2 | 19.96 |
| 41 | Ta2O5 | 13.23 | Ta2O5 | 88.94 | Ta2O5 | 13.57 |
| 42 | SiO2 | 138.84 | SiO2 | 132.16 | SiO2 | 140.90 |
| 43 | Ta2O5 | 13.42 | Ta2O5 | 88.81 | Ta2O5 | 11.81 |
| 44 | SiO2 | 18.83 | SiO2 | 132.06 | SiO2 | 22.09 |
| 45 | Ta2O5 | 93.25 | Ta2O5 | 88.93 | Ta2O5 | 107.32 |
| 46 | SiO2 | 18.14 | SiO2 | 132.33 | SiO2 | 26.90 |
| 47 | Ta2O5 | 13.13 | Ta2O5 | 89.01 | Ta2O5 | 16.20 |
| 48 | SiO2 | 137.02 | SiO2 | 132.26 | SiO2 | 191.94 |
| 49 | Ta2O5 | 13.26 | Ta2O5 | 88.88 | Ta2O5 | 16.19 |
| 50 | SiO2 | 18.82 | SiO2 | 132.08 | SiO2 | 25.50 |
| 51 | Ta2O5 | 93.57 | Ta2O5 | 88.87 | Ta2O5 | 105.51 |
| 52 | SiO2 | 18.34 | SiO2 | 132.33 | SiO2 | 20.60 |
| 53 | Ta2O5 | 13.19 | Ta2O5 | 88.84 | Ta2O5 | 13.80 |
| 54 | SiO2 | 137.81 | SiO2 | 132.48 | SiO2 | 163.59 |
| 55 | Ta2O5 | 13.33 | Ta2O5 | 88.98 | Ta2O5 | 17.29 |
| 56 | SiO2 | 19.05 | SiO2 | 132.21 | SiO2 | 22.71 |
| 57 | Ta2O5 | 94.22 | Ta2O5 | 88.91 | Ta2O5 | 119.85 |
| 58 | SiO2 | 18.48 | SiO2 | 132.44 | SiO2 | 22.21 |
| 59 | Ta2O5 | 12.95 | Ta2O5 | 89.01 | Ta2O5 | 17.78 |
| 60 | SiO2 | 136.64 | SiO2 | 132.59 | SiO2 | 162.92 |
| 61 | Ta2O5 | 13.36 | Ta2O5 | 89.08 | Ta2O5 | 13.85 |
| 62 | SiO2 | 18.78 | SiO2 | 132.76 | SiO2 | 17.02 |
| 63 | Ta2O5 | 93.18 | Ta2O5 | 89.11 | Ta2O5 | 86.83 |
| 64 | SiO2 | 18.26 | SiO2 | 132.68 | SiO2 | 18.92 |
| 65 | Ta2O5 | 13.16 | Ta2O5 | 89.12 | Ta2O5 | 11.69 |
| 66 | SiO2 | 138.25 | SiO2 | 132.96 | SiO2 | 139.34 |

TABLE 2-continued

| | Three-Photon Emitter (FIGS. 9a, 9b, 10a, and 10b) | | | | Three-Photon SWP Dichroic (FIG. 11) |
|---|---|---|---|---|---|
| | Side 1 | | Side 2 | | |
| Layer # | Material Substrate | Thickness (nm) | Material Substrate | Thickness (nm) | Material Substrate | Thickness (nm) |

| Layer # | Material Substrate | Thickness (nm) | Material Substrate | Thickness (nm) | Material Substrate | Thickness (nm) |
|---|---|---|---|---|---|---|
| 67 | Ta2O5 | 13.75 | Ta2O5 | 89.32 | Ta2O5 | 13.58 |
| 68 | SiO2 | 18.56 | SiO2 | 132.91 | SiO2 | 18.07 |
| 69 | Ta2O5 | 93.79 | Ta2O5 | 89.54 | Ta2O5 | 92.93 |
| 70 | SiO2 | 18.18 | SiO2 | 132.71 | SiO2 | 21.33 |
| 71 | Ta2O5 | 13.15 | Ta2O5 | 88.20 | Ta2O5 | 15.84 |
| 72 | SiO2 | 137.41 | SiO2 | 135.29 | SiO2 | 171.73 |
| 73 | Ta2O5 | 13.28 | Ta2O5 | 89.38 | Ta2O5 | 15.76 |
| 74 | SiO2 | 18.77 | SiO2 | 133.17 | SiO2 | 20.67 |
| 75 | Ta2O5 | 93.44 | Ta2O5 | 89.67 | Ta2O5 | 91.80 |
| 76 | SiO2 | 18.31 | SiO2 | 133.72 | SiO2 | 18.13 |
| 77 | Ta2O5 | 13.11 | Ta2O5 | 89.73 | Ta2O5 | 13.55 |
| 78 | SiO2 | 137.02 | SiO2 | 133.42 | SiO2 | 135.15 |
| 79 | Ta2O5 | 13.59 | Ta2O5 | 89.62 | Ta2O5 | 10.52 |
| 80 | SiO2 | 18.80 | SiO2 | 133.81 | SiO2 | 19.16 |
| 81 | Ta2O5 | 94.25 | Ta2O5 | 90.45 | Ta2O5 | 82.93 |
| 82 | SiO2 | 18.61 | SiO2 | 135.00 | SiO2 | 15.40 |
| 83 | Ta2O5 | 13.01 | Ta2O5 | 91.55 | Ta2O5 | 12.14 |
| 84 | SiO2 | 137.39 | SiO2 | 136.27 | SiO2 | 141.37 |
| 85 | Ta2O5 | 13.51 | Ta2O5 | 92.80 | Ta2O5 | 13.82 |
| 86 | SiO2 | 18.52 | SiO2 | 138.12 | SiO2 | 16.16 |
| 87 | Ta2O5 | 93.29 | Ta2O5 | 100.53 | Ta2O5 | 87.34 |
| 88 | SiO2 | 18.08 | SiO2 | 36.16 | SiO2 | 20.48 |
| 89 | Ta2O5 | 13.23 | Ta2O5 | 10.00 | Ta2O5 | 15.11 |
| 90 | SiO2 | 137.47 | SiO2 | 84.55 | SiO2 | 168.82 |
| 91 | Ta2O5 | 13.70 | Ta2O5 | 17.61 | Ta2O5 | 15.35 |
| 92 | SiO2 | 18.46 | SiO2 | 23.63 | SiO2 | 22.76 |
| 93 | Ta2O5 | 93.81 | Ta2O5 | 121.29 | Ta2O5 | 97.79 |
| 94 | SiO2 | 18.39 | SiO2 | 22.35 | SiO2 | 18.42 |
| 95 | Ta2O5 | 13.19 | Ta2O5 | 14.76 | Ta2O5 | 12.47 |
| 96 | SiO2 | 137.68 | SiO2 | 116.30 | SiO2 | 136.80 |
| 97 | Ta2O5 | 13.60 | Ta2O5 | 10.00 | Ta2O5 | 11.41 |
| 98 | SiO2 | 18.49 | SiO2 | 22.63 | SiO2 | 16.70 |
| 99 | Ta2O5 | 93.70 | Ta2O5 | 76.63 | Ta2O5 | 81.83 |
| 100 | SiO2 | 18.44 | SiO2 | 12.00 | SiO2 | 17.35 |
| 101 | Ta2O5 | 13.08 | Ta2O5 | 13.90 | Ta2O5 | 10.27 |
| 102 | SiO2 | 136.49 | SiO2 | 116.21 | SiO2 | 131.59 |
| 103 | Ta2O5 | 13.63 | Ta2O5 | 10.00 | Ta2O5 | 13.49 |
| 104 | SiO2 | 18.48 | SiO2 | 16.80 | SiO2 | 14.00 |
| 105 | Ta2O5 | 94.06 | Ta2O5 | 71.83 | Ta2O5 | 79.89 |
| 106 | SiO2 | 18.49 | SiO2 | 12.76 | SiO2 | 23.30 |
| 107 | Ta2O5 | 13.14 | Ta2O5 | 13.85 | Ta2O5 | 10.39 |
| 108 | SiO2 | 137.76 | SiO2 | 118.26 | SiO2 | 127.69 |
| 109 | Ta2O5 | 13.71 | Ta2O5 | 10.00 | Ta2O5 | 13.53 |
| 110 | SiO2 | 18.31 | SiO2 | 17.19 | SiO2 | 23.58 |
| 111 | Ta2O5 | 93.73 | Ta2O5 | 81.31 | Ta2O5 | 111.95 |
| 112 | SiO2 | 18.24 | SiO2 | 15.12 | SiO2 | 23.51 |
| 113 | Ta2O5 | 13.23 | Ta2O5 | 12.23 | Ta2O5 | 16.62 |
| 114 | SiO2 | 137.01 | SiO2 | 124.99 | SiO2 | 164.22 |
| 115 | Ta2O5 | 13.68 | Ta2O5 | 11.28 | Ta2O5 | 14.04 |
| 116 | SiO2 | 18.26 | SiO2 | 16.69 | SiO2 | 18.00 |
| 117 | Ta2O5 | 93.59 | Ta2O5 | 85.94 | Ta2O5 | 79.83 |
| 118 | SiO2 | 18.31 | SiO2 | 17.38 | SiO2 | 15.99 |
| 119 | Ta2O5 | 13.40 | Ta2O5 | 10.93 | Ta2O5 | 12.40 |
| 120 | SiO2 | 137.61 | SiO2 | 121.85 | SiO2 | 126.53 |
| 121 | Ta2O5 | 13.68 | Ta2O5 | 11.72 | Ta2O5 | 10.00 |
| 122 | SiO2 | 18.42 | SiO2 | 15.56 | SiO2 | 17.34 |
| 123 | Ta2O5 | 94.19 | Ta2O5 | 81.88 | Ta2O5 | 76.18 |
| 124 | SiO2 | 18.44 | SiO2 | 17.45 | SiO2 | 14.00 |
| 125 | Ta2O5 | 13.20 | Ta2O5 | 10.00 | Ta2O5 | 10.99 |
| 126 | SiO2 | 136.43 | SiO2 | 117.70 | SiO2 | 126.78 |
| 127 | Ta2O5 | 13.57 | Ta2O5 | 12.91 | Ta2O5 | 10.00 |
| 128 | SiO2 | 18.31 | SiO2 | 14.54 | SiO2 | 14.70 |
| 129 | Ta2O5 | 93.83 | Ta2O5 | 78.37 | Ta2O5 | 75.55 |
| 130 | SiO2 | 18.41 | SiO2 | 17.99 | SiO2 | 14.08 |
| 131 | Ta2O5 | 13.30 | Ta2O5 | 11.23 | Ta2O5 | 10.15 |
| 132 | SiO2 | 137.39 | SiO2 | 118.48 | SiO2 | 124.74 |
| 133 | Ta2O5 | 13.71 | Ta2O5 | 12.37 | Ta2O5 | 10.00 |
| 134 | SiO2 | 18.40 | SiO2 | 17.34 | SiO2 | 14.07 |
| 135 | Ta2O5 | 94.08 | Ta2O5 | 81.01 | Ta2O5 | 73.75 |
| 136 | SiO2 | 18.29 | SiO2 | 16.51 | SiO2 | 14.00 |
| 137 | Ta2O5 | 13.40 | Ta2O5 | 13.07 | Ta2O5 | 10.00 |
| 138 | SiO2 | 137.21 | SiO2 | 119.37 | SiO2 | 125.38 |
| 139 | Ta2O5 | 13.60 | Ta2O5 | 10.00 | Ta2O5 | 10.00 |
| 140 | SiO2 | 18.11 | SiO2 | 19.56 | SiO2 | 14.00 |
| 141 | Ta2O5 | 93.40 | Ta2O5 | 83.75 | Ta2O5 | 74.07 |
| 142 | SiO2 | 18.43 | SiO2 | 14.00 | SiO2 | 14.00 |
| 143 | Ta2O5 | 13.40 | Ta2O5 | 11.91 | Ta2O5 | 10.00 |
| 144 | SiO2 | 137.12 | SiO2 | 123.39 | SiO2 | 125.41 |
| 145 | Ta2O5 | 13.75 | Ta2O5 | 10.80 | Ta2O5 | 10.00 |
| 146 | SiO2 | 18.19 | SiO2 | 14.57 | SiO2 | 14.00 |
| 147 | Ta2O5 | 94.49 | Ta2O5 | 81.20 | Ta2O5 | 75.60 |
| 148 | SiO2 | 18.63 | SiO2 | 15.66 | SiO2 | 14.00 |
| 149 | Ta2O5 | 13.34 | Ta2O5 | 10.00 | Ta2O5 | 10.00 |
| 150 | SiO2 | 136.73 | SiO2 | 120.58 | SiO2 | 125.34 |
| 151 | Ta2O5 | 13.45 | Ta2O5 | 11.94 | Ta2O5 | 10.00 |
| 152 | SiO2 | 18.27 | SiO2 | 14.00 | SiO2 | 14.00 |
| 153 | Ta2O5 | 93.90 | Ta2O5 | 82.59 | Ta2O5 | 73.86 |
| 154 | SiO2 | 18.43 | SiO2 | 19.33 | SiO2 | 14.00 |
| 155 | Ta2O5 | 13.36 | Ta2O5 | 10.00 | Ta2O5 | 10.00 |
| 156 | SiO2 | 136.73 | SiO2 | 120.29 | SiO2 | 127.04 |
| 157 | Ta2O5 | 13.78 | Ta2O5 | 13.64 | Ta2O5 | 10.00 |
| 158 | SiO2 | 18.09 | SiO2 | 16.31 | SiO2 | 14.38 |
| 159 | Ta2O5 | 94.10 | Ta2O5 | 79.44 | Ta2O5 | 74.51 |
| 160 | SiO2 | 18.52 | SiO2 | 16.87 | SiO2 | 14.00 |
| 161 | Ta2O5 | 13.51 | Ta2O5 | 13.25 | Ta2O5 | 11.69 |
| 162 | SiO2 | 137.81 | SiO2 | 119.81 | SiO2 | 118.28 |
| 163 | Ta2O5 | 13.57 | Ta2O5 | 10.59 | Ta2O5 | 10.00 |
| 164 | SiO2 | 17.97 | SiO2 | 18.98 | SiO2 | 24.61 |
| 165 | Ta2O5 | 93.65 | Ta2O5 | 82.50 | Ta2O5 | 48.05 |
| 166 | SiO2 | 18.32 | SiO2 | 14.82 | SiO2 | 14.00 |
| 167 | Ta2O5 | 13.53 | Ta2O5 | 12.15 | Ta2O5 | 25.53 |
| 168 | SiO2 | 136.54 | SiO2 | 119.37 | SiO2 | 156.38 |
| 169 | Ta2O5 | 13.46 | Ta2O5 | 10.00 | Ta2O5 | 93.36 |
| 170 | SiO2 | 18.13 | SiO2 | 16.83 | SiO2 | 75.95 |
| 171 | Ta2O5 | 94.45 | Ta2O5 | 81.80 | | |
| 172 | SiO2 | 18.75 | SiO2 | 14.91 | | |
| 173 | Ta2O5 | 13.54 | Ta2O5 | 11.01 | | |
| 174 | SiO2 | 137.04 | SiO2 | 120.86 | | |
| 175 | Ta2O5 | 13.45 | Ta2O5 | 11.12 | | |
| 176 | SiO2 | 18.22 | SiO2 | 15.32 | | |
| 177 | Ta2O5 | 94.30 | Ta2O5 | 82.83 | | |
| 178 | SiO2 | 18.44 | SiO2 | 17.18 | | |
| 179 | Ta2O5 | 13.44 | Ta2O5 | 10.58 | | |
| 180 | SiO2 | 136.37 | SiO2 | 121.98 | | |
| 181 | Ta2O5 | 13.45 | Ta2O5 | 12.54 | | |
| 182 | SiO2 | 18.01 | SiO2 | 15.48 | | |
| 183 | Ta2O5 | 93.84 | Ta2O5 | 81.24 | | |
| 184 | SiO2 | 18.44 | SiO2 | 17.29 | | |
| 185 | Ta2O5 | 13.64 | Ta2O5 | 11.33 | | |
| 186 | SiO2 | 138.31 | SiO2 | 121.26 | | |
| 187 | Ta2O5 | 13.58 | Ta2O5 | 12.62 | | |
| 188 | SiO2 | 17.94 | SiO2 | 15.81 | | |
| 189 | Ta2O5 | 94.02 | Ta2O5 | 79.45 | | |
| 190 | SiO2 | 18.48 | SiO2 | 16.68 | | |
| 191 | Ta2O5 | 13.59 | Ta2O5 | 12.09 | | |
| 192 | SiO2 | 136.44 | SiO2 | 120.54 | | |
| 193 | Ta2O5 | 13.16 | Ta2O5 | 12.11 | | |
| 194 | SiO2 | 17.91 | SiO2 | 16.88 | | |
| 195 | Ta2O5 | 94.27 | Ta2O5 | 77.68 | | |
| 196 | SiO2 | 18.79 | SiO2 | 15.02 | | |
| 197 | Ta2O5 | 13.53 | Ta2O5 | 13.39 | | |
| 198 | SiO2 | 136.94 | SiO2 | 121.30 | | |
| 199 | Ta2O5 | 13.25 | Ta2O5 | 10.17 | | |
| 200 | SiO2 | 18.49 | SiO2 | 18.05 | | |
| 201 | Ta2O5 | 94.91 | Ta2O5 | 83.40 | | |
| 202 | SiO2 | 18.78 | SiO2 | 14.87 | | |
| 203 | Ta2O5 | 13.49 | Ta2O5 | 11.48 | | |
| 204 | SiO2 | 136.61 | SiO2 | 123.19 | | |

TABLE 2-continued

| | Three-Photon Emitter (FIGS. 9a, 9b, 10a, and 10b) | | | | Three-Photon SWP Dichroic (FIG. 11) | |
|---|---|---|---|---|---|---|
| | Side 1 | | Side 2 | | | |
| Layer # | Material Substrate | Thickness (nm) | Material Substrate | Thickness (nm) | Material Substrate | Thickness (nm) |
| 205 | Ta2O5 | 13.25 | Ta2O5 | 11.34 | | |
| 206 | SiO2 | 17.68 | SiO2 | 14.90 | | |
| 207 | Ta2O5 | 93.38 | Ta2O5 | 80.14 | | |
| 208 | SiO2 | 18.29 | SiO2 | 15.04 | | |
| 209 | Ta2O5 | 13.59 | Ta2O5 | 10.83 | | |
| 210 | SiO2 | 138.51 | SiO2 | 123.21 | | |
| 211 | Ta2O5 | 13.30 | Ta2O5 | 12.19 | | |
| 212 | SiO2 | 17.86 | SiO2 | 14.00 | | |
| 213 | Ta2O5 | 94.67 | Ta2O5 | 82.96 | | |
| 214 | SiO2 | 18.40 | SiO2 | 19.51 | | |
| 215 | Ta2O5 | 13.92 | Ta2O5 | 10.00 | | |
| 216 | SiO2 | 137.25 | SiO2 | 120.87 | | |
| 217 | Ta2O5 | 12.73 | Ta2O5 | 14.46 | | |
| 218 | SiO2 | 18.05 | SiO2 | 16.36 | | |
| 219 | Ta2O5 | 93.93 | Ta2O5 | 76.68 | | |
| 220 | SiO2 | 19.14 | SiO2 | 16.91 | | |
| 221 | Ta2O5 | 13.20 | Ta2O5 | 14.11 | | |
| 222 | SiO2 | 135.54 | SiO2 | 119.28 | | |
| 223 | Ta2O5 | 12.86 | Ta2O5 | 10.00 | | |
| 224 | SiO2 | 18.31 | SiO2 | 21.16 | | |
| 225 | Ta2O5 | 96.40 | Ta2O5 | 85.26 | | |
| 226 | SiO2 | 18.87 | SiO2 | 14.00 | | |
| 227 | Ta2O5 | 13.44 | Ta2O5 | 11.53 | | |
| 228 | SiO2 | 138.40 | SiO2 | 124.07 | | |
| 229 | Ta2O5 | 13.11 | Ta2O5 | 10.88 | | |
| 230 | SiO2 | 18.03 | SiO2 | 14.00 | | |
| 231 | Ta2O5 | 91.90 | Ta2O5 | 80.26 | | |
| 232 | SiO2 | 18.35 | SiO2 | 14.70 | | |
| 233 | Ta2O5 | 13.46 | Ta2O5 | 10.30 | | |
| 234 | SiO2 | 137.61 | SiO2 | 124.36 | | |
| 235 | Ta2O5 | 13.55 | Ta2O5 | 13.05 | | |
| 236 | SiO2 | 16.04 | SiO2 | 12.69 | | |
| 237 | Ta2O5 | 95.75 | Ta2O5 | 82.36 | | |
| 238 | SiO2 | 18.29 | SiO2 | 20.56 | | |
| 239 | Ta2O5 | 13.27 | Ta2O5 | 10.00 | | |
| 240 | SiO2 | 144.08 | SiO2 | 119.30 | | |
| 241 | Ta2O5 | 11.22 | Ta2O5 | 14.10 | | |
| 242 | SiO2 | 18.52 | SiO2 | 16.98 | | |
| 243 | Ta2O5 | 94.55 | Ta2O5 | 77.21 | | |
| 244 | SiO2 | 17.58 | SiO2 | 16.15 | | |
| 245 | Ta2O5 | 15.33 | Ta2O5 | 14.57 | | |
| 246 | SiO2 | 123.74 | SiO2 | 122.23 | | |
| 247 | Ta2O5 | 11.77 | Ta2O5 | 10.00 | | |
| 248 | SiO2 | 18.46 | SiO2 | 19.47 | | |
| 249 | Ta2O5 | 91.71 | Ta2O5 | 79.64 | | |
| 250 | SiO2 | 67.37 | SiO2 | 12.00 | | |
| 251 | | | Ta2O5 | 13.67 | | |
| 252 | | | SiO2 | 124.06 | | |
| 253 | | | Ta2O5 | 10.00 | | |
| 254 | | | SiO2 | 13.71 | | |
| 255 | | | Ta2O5 | 70.94 | | |
| 256 | | | SiO2 | 10.00 | | |
| 257 | | | Ta2O5 | 13.99 | | |
| 258 | | | SiO2 | 123.58 | | |
| 259 | | | Ta2O5 | 10.00 | | |
| 260 | | | SiO2 | 13.02 | | |
| 261 | | | Ta2O5 | 85.64 | | |
| 262 | | | SiO2 | 68.46 | | |

In addition, $HfO_2$ may be employed, as noted above, instead of $Ta_2O_5$. In that case, UV transmission may be increased and the high transmission band can be extended to lower wavelengths due to the lower material absorption associated with $HfO_2$ at wavelengths below about 330 nm.

FIG. 11 illustrates a transmission characteristic 1200 associated with filter 120 shown in FIG. 1b. Filter 120 may be fabricated in a manner similar to that described above in connection with filter 110. Filter 120, as discussed above, is configured to reflect light from source 102 to sample 108 and pass light emitted from sample 108 toward detector 114. Accordingly, transmission characteristic 1200 has a relatively high transmission over wavelength band 1210 (about 300 nm to about 700 nm) and low transmission (i.e., high reflectivity) over wavelength band 1220 (about 700 nm to about 1100 nm). In this example, the filter layers have a collective thickness of 8.7 µm. The number of layers in filter 120 in this example is 170 and the number of thin sub-layers constituting Herpin equivalent layers is 86. In addition, the average reflectivity over a range of 720 nm to 1100 nm is 97.6%.

Figure 12:
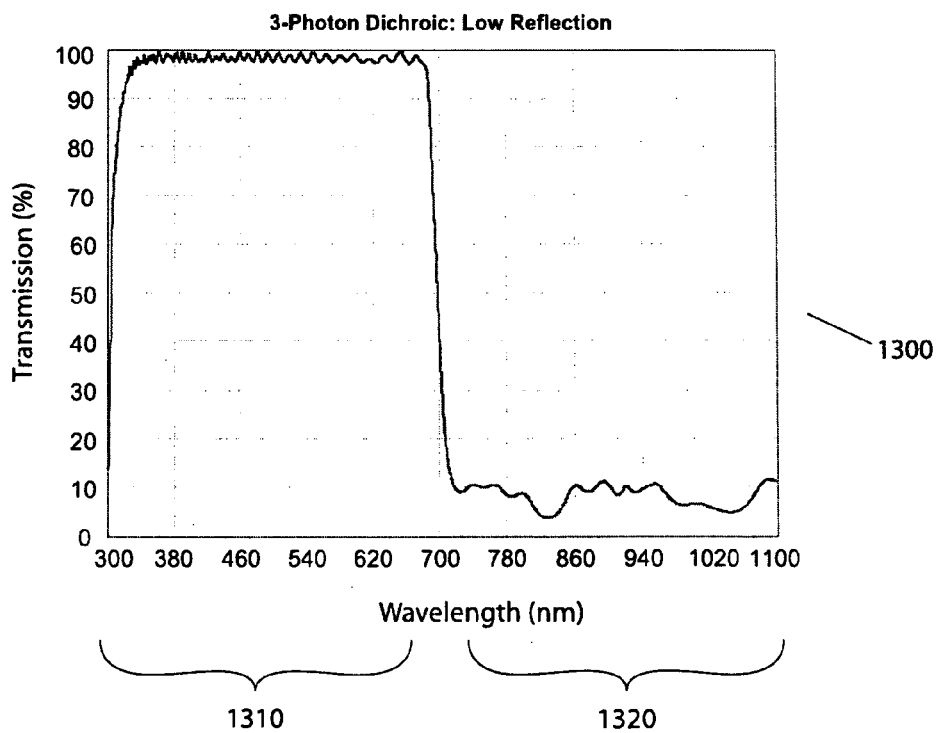

Another transmission characteristic 1300 of an exemplary filter 120 is shown in FIG. 12. Transmission characteristic 1300 has a relatively high transmission over wavelength band 1310 (about 300 nm to about 700 nm) and low transmission (i.e., high reflectivity) over wavelength band 1320 (about 700 nm to about 1100 nm). Here, the filter layers have a collective thickness of 5.6 µm. In addition, the number of layers in filter 120 in this example is 112 and the number of thin sub-layers constituting the Herpin equivalent layers is 54. Moreover, in this example, the average reflectivity is 91.8% in a range of 720 nm to 1100 nm.

Other embodiments will be apparent to those skilled in the art from consideration of the specification. For example, instead of both layers 214 and 216 including Herpin equivalent sub-layers (see FIG. 2), layers 214 may be constructed in a manner analogous to layers 212, i.e., without intermediate-index or Herpin equivalent layers. In that case, the high transmission band may extend to about 400 nm, instead of 300 nm. Accordingly, the overall width of the high transmission band would be narrower by about 100 nm. Such an optical filter has a resulting transmission characteristic having an average transmission greater than or equal to 80% over a first band of wavelengths extending from about 400 nm to about 700 nm.

Furthermore, layers 214 may be provided without layers 216. In that case the filter may have a transmission characteristic similar to that of transmission characteristic 610, with relatively high average transmission, e.g., greater than 80% and preferably greater than 90%, over a transmission band or first band of wavelengths 612, extending, for example, from about 300 nm to about 700 nm, and first, as well as second blocking levels over second and third bands of wavelengths, respectively. The second and third bands of wavelengths include wavelengths greater than 700 nm. Each of the first and second blocking levels has an average optical density (OD) greater than or equal to 5 and preferably greater than or equal to 6. The second and third bands being associated with layers 212 and 214, respectively. Layers 212 and 214 are associated with a respective, first and second transmission characteristic, and each of the first and second transmission characteristics has an average transmission greater than or equal to 80% over the band of wavelengths extending from about 300 nm to about 700 nm.

Figure 13:
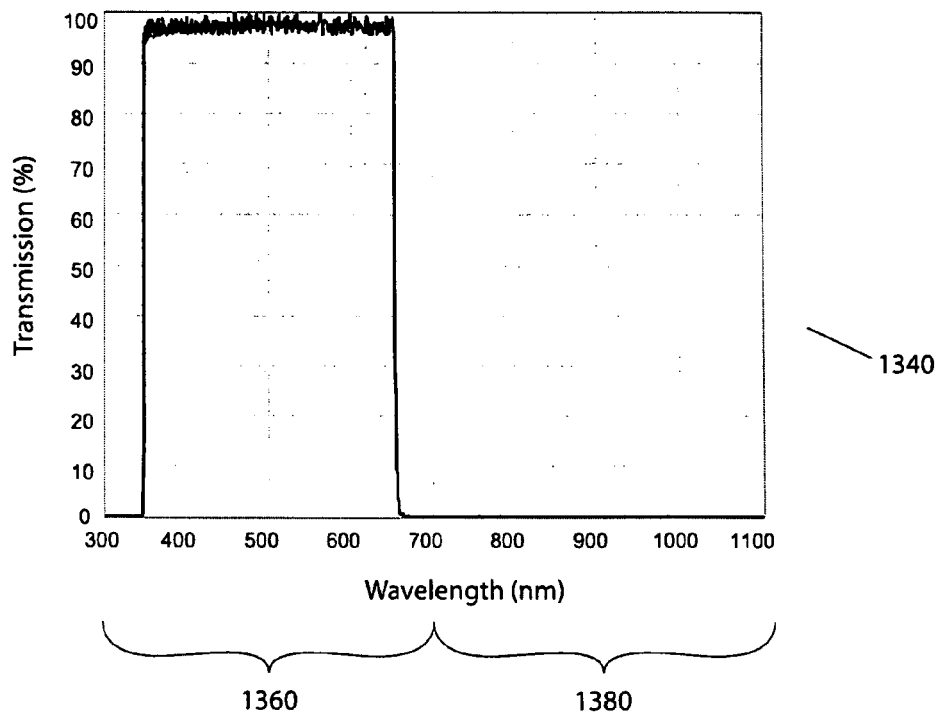
Figure 14:
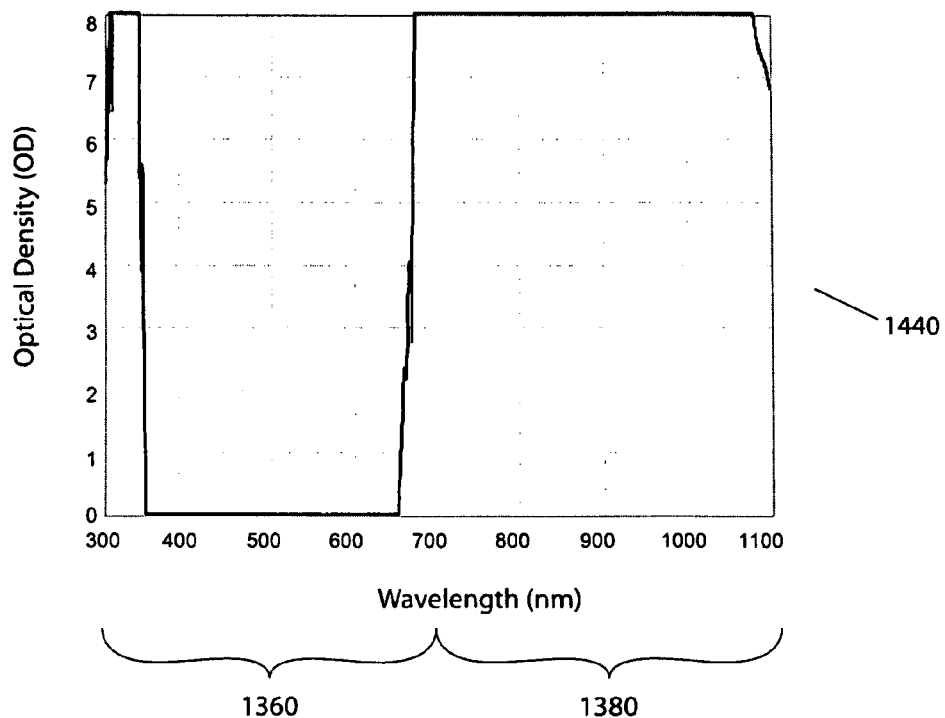

FIGS. 13 and 14 illustrate an exemplary transmission characteristics 1340 and 1440 of a filter consistent with the present disclosure. The filter has a relatively high average transmission exceeding 80%, which, in this example also exceed 90%, over a range of wavelengths 1360 between 380 nm and 650 nm. Consistent with the present disclosure, however, this high transmission band of wavelengths 1360 may extend from a wavelength less than 380 nm to a wavelength within a range of 650 nm to 720 nm (the upper bound of wavelength range 1360). As further shown in FIGS. 13 and 14, the optical filter has a relatively low transmission over a range of wavelengths 1380 extending from 680 nm to 1100 nm. Alternatively, range 1380 can extend to a wavelength greater than 1100 nm. Moreover, instead of 680 nm, the lower bound of wavelength range 1380 may be any wavelength between 680 nm and 750 nm, so long as the lower bound wavelength of range 1380 exceeds the upper bound wavelength of range 1360. The average optical density (OD) over range 1380 exceeds 5, and preferably exceeds 6. In the example shown in FIG. 14, the OD exceeds 8 over range 1380.

Further, consistent with the present disclosure, filters may have transmission characteristics in which the wavelength bands or ranges of high and low transmission may be scaled. In particular, such optical filters may have an average transmission greater than 80% over a wavelength range extending from a wavelength $\lambda_a$ ($\lambda_a$ is a wavelength between 300 nm and 600 nm) to a another wavelength between $\lambda_a$(650/380) and $\lambda_a$(720/380) ("$\lambda_b$"). Such optical filters may also have an average optical density (OD) greater than 5 and preferably greater than 6 over a range extending from a wavelength, which is greater than $\lambda_b$ and is between $\lambda_a$(680/380) and $\lambda_a$(750/380), to a wavelength equal to $\lambda_a$(1100/380).

Figure 15:
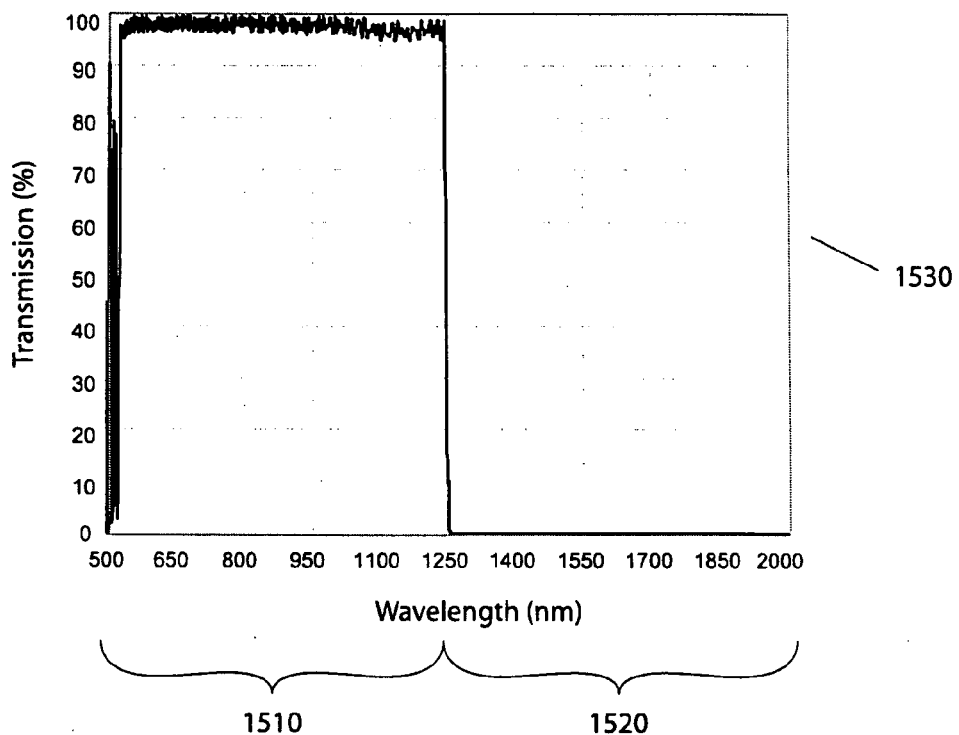
Figure 16:
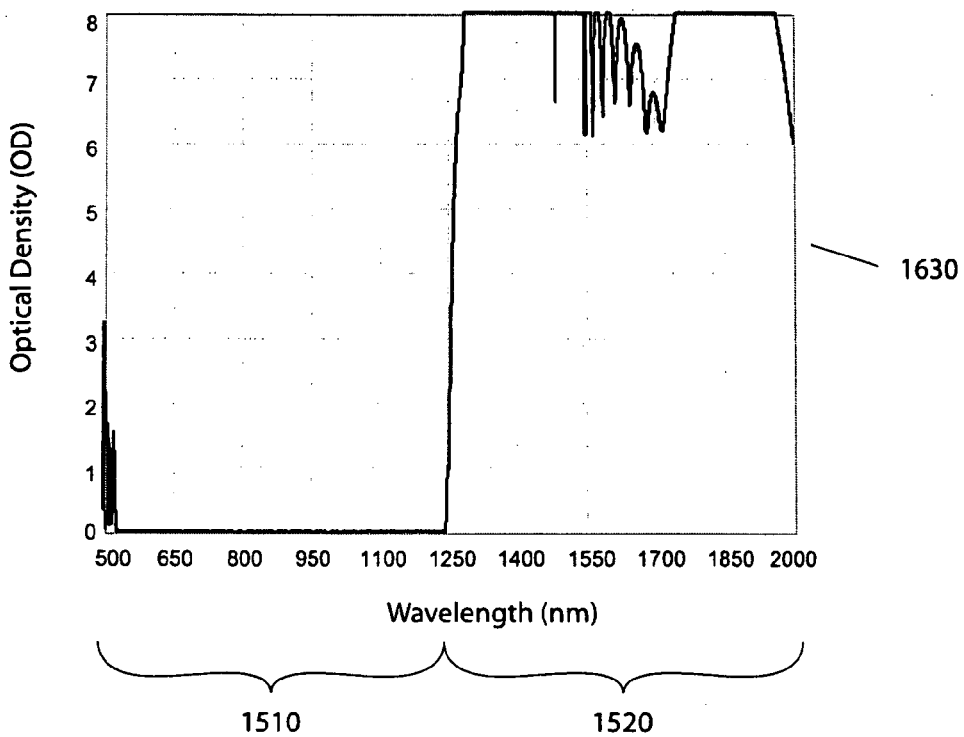

Accordingly, for example, as shown in FIGS. 15 and 16, a filter consistent with the present disclosure may have a scaled transmission characteristic (1530 in FIG. 15 (linear transmission vs. wavelength) and 1630 (OD vs. wavelength) in FIG. 16) in which the filter has relatively high transmission over a range of wavelengths 1510 and relatively low transmission over a range of wavelengths 1520. In particular, range 1510 includes wavelengths from 691 nm to a wavelength between 1182 nm to 1309 nm. In addition range 1520, having relatively high blocking with an average OD exceeding 6 (FIG. 16), includes a wavelength between 1237 nm and 1369 nm and extends to 2000 nm.

As discussed above, filters consistent with the present disclosure provide relatively high transmission over a wavelength range of about 300 nm to 700 nm, but have high blocking from about 700 nm to 1100 nm. Such filters are thus suitable for multiphoton fluorescence applications in which blocking of Ti:Sapphire laser wavelengths and high transmission at sample emission wavelengths of 300 nm to 700 nm are desired.

It is intended that the specification and examples be considered as exemplary only, with a true scope and spirit of the invention being indicated by the following claims.

What is claimed is:

1. An optical filter comprising:
    a substrate;
    a first plurality of hard-coating layers provided on the substrate and including alternating first and second layers, the first layers having a first refractive index and the second layers having a second refractive index greater than the first refractive index;
    a second plurality of hard-coating layers including a repeating sequence of a third layer and a first instance of a first layer group and a fourth layer and a second instance of a first layer group provided on the substrate, each third layer having a third refractive index, each first layer group comprising at least one of a first intermediate index layer and a first Herpin equivalent layer, said first intermediate index layer having a first intermediate refractive index, and said first Herpin equivalent layer having a first effective refractive index substantially equivalent to said first intermediate refractive index, and each fourth layer having a fourth refractive index, the first intermediate refractive index being greater than the third refractive index and less than the fourth refractive index; and
    a third plurality of hard-coating layers including a repeating sequence of a fifth layer and a first instance of a second layer group and a sixth layer and a second instance of a second layer group provided on the substrate, each fifth layer having a fifth refractive index, each second layer group comprising at least one of a second intermediate index layer and a second Herpin equivalent layer, said second intermediate index layer having a second intermediate refractive index, and said second Herpin equivalent layer having a second effective refractive index substantially equivalent to said second intermediate refractive index, and each sixth layer having a sixth refractive index, the second intermediate refractive index being greater than the fifth refractive index and less than the sixth refractive index,
    wherein each instance of the first layer group is said first Herpin equivalent layer, said first Herpin equivalent layer comprising at least one first sub-layer and at least one second sub-layer and each instance of the second layer group is said second Herpin equivalent layer, said second Herpin equivalent layer comprising at least one third sub-layer and at least one fourth sub-layer, wherein the thickness of each of said first, second, third, and fourth sub-layers is substantially less than the thickness of at least one of said first, second, third, fourth, fifth, and sixth layers.

2. An optical filter in accordance with claim 1, wherein each first layer, each third layer, each fifth layer, each first sub-layer, and each third sub-layer includes silicon dioxide ($SiO_2$).

3. An optical filter in accordance with claim 1, wherein each second layer, each fourth layer, each sixth layer, each second sub-layer, and each fourth sub-layer includes tantalum pentoxide ($Ta_2O_5$).

4. An optical filter in accordance with claim 1, wherein each second layer, each fourth layer, each sixth layer, each second sub-layer, and each fourth sub-layer includes hafnium oxide ($HfO_2$).

5. An optical filter in accordance with claim 1, wherein each second layer, each fourth layer, each sixth layer, each second sub-layer, and each fourth sub-layer includes at least one compound chosen from: niobium pentoxide ($Nb_2O_5$), titanium dioxide ($TiO_2$), and aluminum pentoxide ($Al_2O_5$).

6. An optical filter in accordance with claim 1, wherein the substrate has a first surface and a second surface, the first and second pluralities of hard-coating layers being provided on the first surface, and the third plurality of hard-coating layers being provided on the second surface.

7. An optical filter in accordance with claim 1, wherein the substrate has a first surface and a second surface, wherein the first plurality of hard-coating layers and the third plurality of hard-coating layers are provided on the first surface, and the second plurality of hard-coating layers is provided on the second surface.

8. An optical filter in accordance with claim 1, wherein the substrate has a first surface and a second surface, wherein the first, second, and third pluralities of hard-coating layers are provided on the first surface.

9. An optical system comprising:
    an optical source configured to output light at a first wavelength, the light at the first wavelength being directed toward a sample, which emits light at a second wavelength in response to the light at the first wavelength;
    an optical detector configured to sense the light at the second wavelength; and
    an optical filter in accordance with claim 4, wherein the optical filter is configured such that the light at the second wavelength passes through the optical filter to the optical detector.

10. An optical system in accordance with claim 9, wherein each first layer, each third layer, each fifth layer, each first sub-layer, and each third sub-layer includes silicon dioxide ($SiO_2$).

11. An optical system in accordance with claim 9, wherein each second layer, each fourth layer, each sixth layer, each second sub-layer, and each fourth sub-layer includes tantalum pentoxide ($Ta_2O_5$).

12. An optical system in accordance with claim 9, wherein each second layer, each fourth layer, each sixth layer, each second sub-layer, and each fourth sub-layer includes hafnium oxide ($HfO_2$).

13. An optical system in accordance with claim 9, wherein each second layer, each fourth layer, each sixth layer, each second sub-layer, and each fourth sub-layer includes at least one compound chosen from: niobium pentoxide ($Nb_2O_5$), titanium dioxide ($TiO_2$), and aluminum pentoxide ($Al_2O_5$).

14. An optical system in accordance with claim 9, wherein the substrate has a first surface and a second surface, wherein the first and second pluralities of hard-coating layers are provided on the first surface, and the third plurality of hard-coating layers are provided on the second surface.

15. An optical system in accordance with claim 9, wherein the substrate has a first surface and a second surface, wherein the first and third pluralities of hard-coating layers are provided on the first surface, and the second plurality of hard-coating layers are provided on the second surface.

16. An optical system in accordance with claim 9, wherein the substrate has a first surface and a second surface, wherein the first, second, and third pluralities of hard-coating layers are provided on the first surface.

17. An optical system in accordance with claim 9, wherein the optical filter is a first filter, the system further including a second filter, the second filter being configured to direct the light at the first wavelength to the sample and to reflect the light at the second wavelength toward the first filter.

18. An optical system in accordance with claim 9, wherein the optical filter is a first filter, the system further including a second filter, the second filter being configured to reflect the light at the first wavelength and to transmit the light at the second wavelength toward the first filter.

19. An optical filter comprising:
a substrate;
a first plurality of alternating first and second hard-coating layers provided on the substrate, the first layers having a first refractive index and the second layers having a second refractive index greater than the first refractive index; and
a second plurality of hard-coating layers including a repeating sequence of a third layer and a first instance of a layer group and a fourth layer and a second instance of a layer group provided on the substrate, each third layer having a third refractive index, each layer group comprising at least one of an intermediate index layer and a Herpin equivalent layer, said intermediate index layer having an intermediate refractive index and said Herpin equivalent layer having an effective refractive index substantially equivalent to said intermediate refractive index, and each fourth layer having a fourth refractive index, the intermediate refractive index being greater than the third refractive index and less than the fourth refractive index, wherein the optical filter has a transmission characteristic as a function of wavelength, the transmission characteristic having an average transmission greater than or equal to 80% over a first band of wavelengths, and a first blocking level over a second band of wavelengths, and a second blocking level over a third band of wavelengths, each of the first and second blocking levels having an average optical density (OD) greater than or equal to 6, the second and third bands of wavelengths being associated with the first and second pluralities of hard-coating layers, respectively, and each of the first and second pluralities of hard-coating layers being associated with a respective, first and second transmission characteristic, each of the first and second transmission characteristics having an average transmission greater than or equal to 80% over the first band of wavelengths, and wherein each instance of the layer group is said Herpin equivalent layer, said Herpin equivalent layer comprising at least one first sub-layer and at least one second sub-layer, wherein the thickness of said first and second sub-layers is substantially less than the thickness of at least one of said first, second, third, and fourth layers.

20. An optical filter in accordance with claim 19, wherein each first layer, each third layer, and each first sub-layer includes silicon dioxide ($SiO_2$).

21. An optical filter in accordance with claim 19, wherein each second layer, each fourth layer, and each second sub-layer includes tantalum pentoxide ($Ta_2O_5$).

22. An optical filter in accordance with claim 19, wherein each second layer, each fourth layer, and each second sub-layer includes hafnium oxide ($HfO_2$).

23. An optical filter in accordance with claim 19, wherein each second layer, each fourth layer, and each second sub-layer includes at least one compound chosen from: niobium pentoxide ($Nb_2O_5$), titanium dioxide ($TiO_2$), and aluminum pentoxide ($Al_2O_5$).

* * * * *